US012159353B2

(12) United States Patent
Petrovskaya et al.

(10) Patent No.: US 12,159,353 B2
(45) Date of Patent: Dec. 3, 2024

(54) OPTIMIZING HEAD MOUNTED DISPLAYS FOR AUGMENTED REALITY

(71) Applicant: Intel Corporation, Santa Clara, CA (US)

(72) Inventors: Anna Petrovskaya, Los Altos, CA (US); Peter Varvak, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 6 days.

(21) Appl. No.: 17/384,293

(22) Filed: Jul. 23, 2021

(65) Prior Publication Data

US 2021/0350630 A1  Nov. 11, 2021

Related U.S. Application Data

(63) Continuation of application No. 17/094,138, filed on Nov. 10, 2020, now Pat. No. 11,468,645, which is a
(Continued)

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0101* (2013.01); *G06F 1/163* (2013.01);
(Continued)

(58) Field of Classification Search
CPC ....... G06T 19/006; G06T 17/20; G06T 15/04; G06F 1/163; G06F 3/005; G06F 3/011;
(Continued)

(56) References Cited

U.S. PATENT DOCUMENTS 5,537,128 A   7/1996  Keene
5,832,212 A   11/1998 Cragun
(Continued)

OTHER PUBLICATIONS

United States Patent and Trademark Office, "Corrected Notice of Allowability," mailed in connection with U.S. Appl. No. 17/094,138, on Jun. 13, 2022, 2 pages.
(Continued)

*Primary Examiner* — Michelle Chin
(74) *Attorney, Agent, or Firm* — Hanley, Flight & Zimmerman, LLC

(57) ABSTRACT

While many augmented reality systems provide "see-through" transparent or translucent displays upon which to project virtual objects, many virtual reality systems instead employ opaque, enclosed screens. Indeed, eliminating the user's perception of the real-world may be integral to some successful virtual reality experiences. Thus, head mounted displays designed exclusively for virtual reality experiences may not be easily repurposed to capture significant portions of the augmented reality market. Various of the disclosed embodiments facilitate the repurposing of a virtual reality device for augmented reality use. Particularly, by anticipating user head motion, embodiments may facilitate scene renderings better aligned with user expectations than naïve renderings generated within the enclosed field of view. In some embodiments, the system may use procedural mapping methods to generate a virtual model of the environment. The system may then use this model to supplement the anticipatory rendering.

25 Claims, 29 Drawing Sheets

Related U.S. Application Data continuation of application No. 16/706,108, filed on Dec. 6, 2019, now Pat. No. 10,832,488, which is a continuation of application No. 16/051,099, filed on Jul. 31, 2018, now Pat. No. 10,504,291, which is a continuation of application No. 15/406,652, filed on Jan. 13, 2017, now Pat. No. 10,043,319.

(60) Provisional application No. 62/279,615, filed on Jan. 15, 2016, provisional application No. 62/279,604, filed on Jan. 15, 2016.

(51) Int. Cl.
*G06F 1/16* (2006.01)
*G06F 3/00* (2006.01)
*G06F 3/01* (2006.01)
*G06F 3/03* (2006.01)
*G06F 3/0346* (2013.01)
*G06T 15/04* (2011.01)
*G06T 17/20* (2006.01)

(52) U.S. Cl.
CPC .............. *G06F 3/005* (2013.01); *G06F 3/011* (2013.01); *G06F 3/012* (2013.01); *G06F 3/017* (2013.01); *G06F 3/0308* (2013.01); *G06F 3/0346* (2013.01); *G06T 15/04* (2013.01); *G06T 17/20* (2013.01); *G02B 2027/014* (2013.01)

(58) Field of Classification Search
CPC ........ G06F 3/012; G06F 3/017; G06F 3/0308; G06F 3/0346; G02B 27/0101; G02B 2027/014
See application file for complete search history.

(56) References Cited

U.S. PATENT DOCUMENTS

| | | | |
|---|---|---|---|
| 6,922,701 B1 | 7/2005 | Ananian | |
| 7,002,551 B2 | 2/2006 | Azuma | |
| 7,313,825 B2 | 12/2007 | Redlich | |
| 7,382,244 B1 | 6/2008 | Donovan | |
| 7,546,334 B2 | 6/2009 | Redlich | |
| 7,583,275 B2 | 9/2009 | Neumann | |
| 8,275,635 B2 | 9/2012 | Stivoric | |
| 8,452,080 B2 | 5/2013 | Engedal | |
| 8,521,128 B1 | 8/2013 | Welsh | |
| 8,620,532 B2 | 12/2013 | Curtis | |
| 8,839,121 B2 | 9/2014 | Bertolami | |
| 8,933,931 B2 | 1/2015 | Balan | |
| 9,124,635 B2 | 9/2015 | Robinson | |
| 9,256,987 B2 | 2/2016 | Ackerman | |
| 9,304,970 B2 | 4/2016 | Wirola | |
| 9,574,419 B2 | 2/2017 | James | |
| 9,595,083 B1 | 3/2017 | Smith | |
| 9,754,419 B2 | 9/2017 | Petrovskaya | |
| 9,916,002 B2 | 3/2018 | Petrovskaya | |
| 9,928,660 B1 | 3/2018 | Vembar | |
| 10,043,319 B2 | 8/2018 | Petrovskaya | |
| 10,504,291 B2 | 12/2019 | Petrovskaya | |
| 10,573,079 B2 | 2/2020 | Vembar | |
| 10,832,488 B2 | 11/2020 | Petrovskaya | |
| 11,017,712 B2 | 5/2021 | Kuwahara | |
| 11,210,993 B2 | 12/2021 | Kuwahara | |
| 11,244,512 B2 | 2/2022 | Vembar | |
| 11,468,645 B2 | 10/2022 | Petrovskaya et al. | |
| 11,514,839 B2 | 11/2022 | Kuwahara et al. | |
| 11,542,870 B1 | 1/2023 | Rambo | |
| 11,721,275 B2 | 8/2023 | Kuwahara et al. | |
| 2002/0013675 A1 | 1/2002 | Knoll | |
| 2004/0107356 A1 | 6/2004 | Shamoon | |
| 2005/0035945 A1* | 2/2005 | Keenan | G06F 3/03543 345/163 |
| 2005/0132070 A1 | 6/2005 | Redlich | |
| 2006/0238380 A1 | 10/2006 | Kimchi | |
| 2006/0256110 A1 | 11/2006 | Okuno | |
| 2007/0035562 A1 | 2/2007 | Azuma | |
| 2008/0172201 A1 | 7/2008 | Kotake | |
| 2008/0195956 A1 | 8/2008 | Baron | |
| 2009/0047972 A1 | 2/2009 | Neeraj | |
| 2009/0104585 A1 | 4/2009 | Diangelo | |
| 2009/0104686 A1 | 4/2009 | Lee | |
| 2009/0278917 A1 | 11/2009 | Dobbins | |
| 2010/0060632 A1 | 3/2010 | Lefevre | |
| 2010/0103196 A1 | 4/2010 | Kumar | |
| 2010/0164990 A1 | 7/2010 | Van Doorn | |
| 2010/0166294 A1 | 7/2010 | Marrion | |
| 2010/0182340 A1 | 7/2010 | Bachelder | |
| 2010/0277571 A1* | 11/2010 | Xu | G06T 17/00 348/47 |
| 2010/0306825 A1 | 12/2010 | Spivack | |
| 2011/0046925 A1 | 2/2011 | Bidard | |
| 2011/0098553 A1* | 4/2011 | Robbins | A61B 5/055 600/410 |
| 2011/0102460 A1 | 5/2011 | Parker | |
| 2011/0199479 A1 | 8/2011 | Waldman | |
| 2011/0221771 A1 | 9/2011 | Cramer | |
| 2011/0286631 A1 | 11/2011 | Wagner | |
| 2011/0313773 A1 | 12/2011 | Herzog | |
| 2012/0105475 A1 | 5/2012 | Tseng | |
| 2012/0197439 A1 | 8/2012 | Wang | |
| 2012/0249741 A1 | 10/2012 | Maciocci | |
| 2012/0315884 A1 | 12/2012 | Forutanpour | |
| 2012/0329486 A1 | 12/2012 | Gits | |
| 2013/0026224 A1 | 1/2013 | Ganick | |
| 2013/0042296 A1 | 2/2013 | Hastings | |
| 2013/0044130 A1 | 2/2013 | Geisner | |
| 2013/0101163 A1 | 4/2013 | Gupta | |
| 2013/0116968 A1 | 5/2013 | Wirola | |
| 2013/0117377 A1 | 5/2013 | Miller | |
| 2013/0129230 A1 | 5/2013 | Shotton | |
| 2013/0132477 A1 | 5/2013 | Bosworth | |
| 2013/0132488 A1 | 5/2013 | Bosworth | |
| 2013/0174213 A1 | 7/2013 | Liu | |
| 2013/0176447 A1 | 7/2013 | Nakashima | |
| 2013/0182891 A1 | 7/2013 | Ling | |
| 2013/0222369 A1 | 8/2013 | Huston | |
| 2013/0242106 A1 | 9/2013 | Jussi | |
| 2013/0286004 A1 | 10/2013 | Mcculloch | |
| 2014/0002444 A1 | 1/2014 | Bennett | |
| 2014/0125699 A1 | 5/2014 | Lotto | |
| 2014/0189515 A1 | 7/2014 | Waldman | |
| 2014/0204077 A1 | 7/2014 | Kamuda | |
| 2014/0210710 A1 | 7/2014 | Shin | |
| 2014/0241614 A1 | 8/2014 | Lee | |
| 2014/0254934 A1 | 9/2014 | Laxminarayana Bhat | |
| 2014/0267234 A1 | 9/2014 | Hook | |
| 2014/0276242 A1 | 9/2014 | Chen | |
| 2014/0292645 A1 | 10/2014 | Tsurumi | |
| 2014/0307793 A1 | 10/2014 | Macinnis | |
| 2014/0307798 A1 | 10/2014 | Taubman | |
| 2014/0323148 A1 | 10/2014 | Schmalstieg | |
| 2014/0324517 A1 | 10/2014 | Harris | |
| 2014/0357290 A1 | 12/2014 | Grabner | |
| 2014/0368532 A1 | 12/2014 | Keane | |
| 2015/0035945 A1* | 2/2015 | Zhang | H04N 13/204 348/46 |
| 2015/0046284 A1 | 2/2015 | Hart | |
| 2015/0123993 A1 | 5/2015 | Ohba | |
| 2015/0143459 A1 | 5/2015 | Molnar | |
| 2015/0183465 A1 | 7/2015 | Lee | |
| 2015/0204676 A1 | 7/2015 | Zhang | |
| 2015/0206350 A1 | 7/2015 | Gardes | |
| 2015/0208072 A1 | 7/2015 | Chen | |
| 2015/0228114 A1 | 8/2015 | Shapira | |
| 2015/0234455 A1* | 8/2015 | LaValle | G06F 3/012 345/8 |
| 2015/0234462 A1 | 8/2015 | Miller | |
| 2015/0287246 A1 | 10/2015 | Huston | |
| 2015/0294473 A1* | 10/2015 | Michot | H04N 13/111 382/154 |
| 2015/0296170 A1 | 10/2015 | Farrell | |

(56) References Cited

U.S. PATENT DOCUMENTS

| | | |
|---|---|---|
| 2015/0309263 A2 | 10/2015 | Abovitz |
| 2015/0317518 A1 | 11/2015 | Fujimaki |
| 2015/0332439 A1 | 11/2015 | Zhang |
| 2015/0348511 A1 | 12/2015 | Oriol |
| 2015/0363976 A1* | 12/2015 | Henson ............... H04N 13/344 345/419 |
| 2016/0026253 A1 | 1/2016 | Bradski |
| 2016/0049008 A1 | 2/2016 | Haddick |
| 2016/0080642 A1 | 3/2016 | Jung |
| 2016/0098862 A1 | 4/2016 | Wilson |
| 2016/0110560 A1 | 4/2016 | Forte |
| 2016/0119536 A1 | 4/2016 | Carceroni |
| 2016/0147064 A1 | 5/2016 | Border |
| 2016/0180590 A1 | 6/2016 | Kamhi |
| 2016/0189419 A1 | 6/2016 | Fakih |
| 2016/0217623 A1 | 7/2016 | Singh |
| 2016/0260260 A1 | 9/2016 | Fei |
| 2016/0282619 A1 | 9/2016 | Oto |
| 2016/0335275 A1 | 11/2016 | Williams |
| 2016/0335497 A1 | 11/2016 | Williams |
| 2016/0335802 A1 | 11/2016 | Bradski |
| 2016/0337599 A1 | 11/2016 | Williams |
| 2016/0358485 A1 | 12/2016 | Sommer |
| 2016/0360970 A1* | 12/2016 | Tzvieli ................. A61B 5/0075 |
| 2017/0021273 A1 | 1/2017 | Rios |
| 2017/0123750 A1 | 5/2017 | Todasco |
| 2017/0201740 A1 | 7/2017 | Gordon |
| 2017/0223338 A1* | 8/2017 | Kang ..................... H04N 13/25 |
| 2017/0276780 A1 | 9/2017 | Takehara |
| 2017/0293146 A1 | 10/2017 | Nicholls |
| 2017/0294044 A1 | 10/2017 | Yerli |
| 2017/0374343 A1 | 12/2017 | Boulton |
| 2018/0004285 A1 | 1/2018 | Castleman |
| 2018/0008141 A1 | 1/2018 | Krueger |
| 2018/0046431 A1 | 2/2018 | Thagadur Shivappa et al. |
| 2018/0047332 A1 | 2/2018 | Kuwahara |
| 2018/0075654 A1 | 3/2018 | Vembar |
| 2018/0165888 A1 | 6/2018 | Duan |
| 2018/0218543 A1 | 8/2018 | Vembar |
| 2018/0293774 A1* | 10/2018 | Yu ........................... G06T 15/06 |
| 2018/0321738 A1* | 11/2018 | Jassal ................. G06Q 30/0261 |
| 2018/0373320 A1 | 12/2018 | Petrovskaya |
| 2019/0139311 A1 | 5/2019 | Petrovskaya |
| 2019/0172410 A1 | 6/2019 | Okumura |
| 2019/0179423 A1 | 6/2019 | Rose |
| 2019/0355050 A1 | 11/2019 | Geisler |
| 2020/0160609 A1 | 5/2020 | Vembar |
| 2021/0118357 A1 | 4/2021 | Kuwahara |
| 2021/0125415 A1 | 4/2021 | Petrovskaya |
| 2021/0350630 A1 | 11/2021 | Petrovskaya |
| 2022/0122516 A1 | 4/2022 | Kuwahara |

OTHER PUBLICATIONS

United States Patent and Trademark Office, "Notice of Allowance" issued in U.S. Appl. No. 17/561,661 on Aug. 9, 2022 (8 pages).
United States Patent and Trademark Office, "Supplemental Notice of Allowability" issued in U.S. Appl. No. 17/094,138 on Aug. 24, 2022 (8 pages).
United States Patent and Trademark Office, "Notice of Allowance and Fee(s) Due," issued in connection with U.S. Appl. No. 17/561,661, dated Aug. 9, 2022, 8 pages.
United States Patent and Trademark Office, "Non-Final Office Action", issued in connection with U.S. Appl. No. 17/384,293, dated Feb. 16, 2023, 15 pages.
United States Patent and Trademark Office, "Notice of Allowance and Fee(s) Due", issued in connection with U.S. Appl. No. 17/993,614, filed Mar. 15, 2023, 11 pages.
Lorensen et al., "Marching Cubes: A High Resolution 3D Surface Construction Algorithm," in ACM Siggraph Computer Graphics, vol. 2t No. 4, Jul. 1987, pp. 163-169.
Curless et al., "A Volumetric Method for Building Complex Models from Range Images," Proceedings of the 23rd Annual Conference on Computer Graphics and Interactive Techniques, 1996, 10 pages.
Petrovskaya, "Towards Dependable Robotic Perception," PhD Thesis, Jun. 2011, 226 pages.
United States Patent and Trademark Office, "Notice of Allowance," mailed in connection with U.S. Appl. No. 17/133,265, on Aug. 30, 2021, 11 pages.
Bradski, Gary, U.S. Appl. No. 62/012,273, filed Jun. 2014 (Year: 2014).
International Searching Authority, "International Search Report and Written Opinion," issued in connection with PCT No. PCT/US2015/060744, mailed on Feb. 2, 2016, 8 pages.
United States Patent and Trademark Office, "Non-Final Action" issued in U.S. Appl. No. 15/054,082 on Dec. 9, 2016 (9 pages).
United States Patent and Trademark Office, "Final Action" issued in U.S. Appl. No. 15/054,082 on May 4, 2017 (12 pages).
United States Patent and Trademark Office, "Non-Final Action" issued in U.S. Appl. No. 15/406,652 on Oct. 6, 2017 (22 pages).
United States Patent and Trademark Office, "Notice of Allowance" issued in U.S. Appl. No. 15/262,369 on Nov. 13, 2017 (7 pages).
United States Patent and Trademark Office, "Notice of Allowability" issued in U.S. Appl. No. 15/054,082 on Dec. 29, 2017 (5 pages).
United States Patent and Trademark Office, "Notice of Allowance" issued in U.S. Appl. No. 15/054,082 on Jan. 19, 2018 (8 pages).
United States Patent and Trademark Office, "Notice of Allowance" issued in U.S. Appl. No. 15/406,652 on Apr. 27, 2018 (10 pages).
United States Patent and Trademark Office, "Non-Final Action" issued in U.S. Appl. No. 15/675,653 on Sep. 17, 2018 (10 pages).
United States Patent and Trademark Office, "Final Action" issued in U.S. Appl. No. 15/675,653 on Jan. 10, 2019 (12 pages).
United States Patent and Trademark Office, "Non-Final Action" issued in U.S. Appl. No. 16/051,099 on Jan. 25, 2019 (4 pages).
United States Patent and Trademark Office, "Non-Final Office Action", issued in connection with U.S. Appl. No. 15/879,717, filed Feb. 21, 2019, 19 pages.
United States Patent and Trademark Office, "Non-Final Rejection", issued in connection with U.S. Appl. No. 16/034,275, filed Mar. 8, 2019, 4 pages.
United States Patent and Trademark Office, "Non-Final Action" issued in U.S. Appl. No. 15/937,649 on Apr. 4, 2019 (14 pages).
United States Patent and Trademark Office, "Corrected Notice of Allowability" issued in U.S. Appl. No. 17/094,138 on Jun. 13, 2022 (2 pages).
United States Patent and Trademark Office, "Final Rejection", issued in connection with U.S. Appl. No. 16/034,275, filed Jun. 11, 2019, 18 pages.
United States Patent and Trademark Office, "Notice of Allowance" issued in U.S. Appl. No. 16/051,099 on Aug. 7, 2019 (11 pages).
United States Patent and Trademark Office, "Final Action" issued in U.S. Appl. No. 15/937,649 on Aug. 16, 2019 (11 pages).
United States Patent and Trademark Office, "Final Office Action," mailed in connection with U.S. Appl. No. 15/879,717, on Sep. 16, 2019, 12 pages.
United States Patent and Trademark Office, "Notice of Allowability" issued in U.S. Appl. No. 16/051,099 on Sep. 30, 2019 (8 pages).
United States Patent and Trademark Office, "Notice of Allowance" issued in U.S. Appl. No. 15/937,649 on Oct. 17, 2019 (7 pages).
United States Patent and Trademark Office, "Non-Final Action" issued in U.S. Appl. No. 16/706,108 on Mar. 10, 2020 (7 pages).
United States Patent and Trademark Office, "Notice of Allowance" issued in U.S. Appl. No. 17/094,138 on May 9, 2022 (9 pages).
United States Patent and Trademark Office, "Non-Final Office Action", issued in connection with U.S. Appl. No. 15/879,717, filed Apr. 24, 2020, 12 pages.
United States Patent and Trademark Office, "Notice of Allowance" issued in U.S. Appl. No. 16/706,108 on Jul. 8, 2020 (9 pages).
United States Patent and Trademark Office, "Non-Final Action" issued in U.S. Appl. No. 15/675,653 on Aug. 10, 2020 (13 pages).
United States Patent and Trademark Office, "Final Office Action", issued in connection with U.S. Appl. No. 15/879,717, filed Oct. 19, 2020, 13 pages.
United States Patent and Trademark Office, "Non-Final Action" issued in U.S. Appl. No. 16/749,501 on Dec. 10, 2020 (23 pages).

(56) References Cited

OTHER PUBLICATIONS

United States Patent and Trademark Office, "Notice of Allowance" issued in U.S. Appl. No. 15/675,653 on Feb. 18, 2021 (7 pages).

United States Patent and Trademark Office, "Final Office Action", issued in connection with U.S. Appl. No. 15/879,717, filed Mar. 15, 2022, 19 pages.

United States Patent and Trademark Office, "Corrected Notice of Allowance and Fee(s) Due," issued in connection with U.S. Appl. No. 15/675,653, dated Mar. 22, 2021, 4 pages.

United States Patent and Trademark Office, "Final Action" issued in U.S. Appl. No. 16/749,501 on May 11, 2021 (23 pages).

United States Patent and Trademark Office, "Non-Final Office Action", issued in connection with U.S. Appl. No. 15/879,717, filed Aug. 3, 2021, 12 pages.

United States Patent and Trademark Office, "Non-Final Action" issued in U.S. Appl. No. 17/094,138 on Aug. 11, 2021 (9 pages).

United States Patent and Trademark Office, "Advisory Action, " mailed in connection with U.S. Appl. No. 16/749,501, on Aug. 26, 2021, 2 pages.

United States Patent and Trademark Office, "Notice of Allowance" issued in U.S. Appl. No. 17/133,265 on Aug. 30, 2021 (11 pages).

United States Patent and Trademark Office, "Notice of Allowability" issued in U.S. Appl. No. 17/133,265 on Sep. 9, 2021 (2 pages).

United States Patent and Trademark Office, "Advisory Action," mailed in connection with U.S. Appl. No. 16/749,501, on Aug. 26, 2021, 3 pages.

United States Patent and Trademark Office, "Notice of Allowance" issued in U.S. Appl. No. 16/749,501 on Oct. 1, 2021 (8 pages).

United States Patent and Trademark Office, "Notice of Allowance" issued in U.S. Appl. No. 17/133,265 on Oct. 18, 2021 (2 pages).

United States Patent and Trademark Office, "Final Action" issued in U.S. Appl. No. 17/094,138 on Jan. 31, 2022 (6 pages).

United States Patent and Trademark Office, "Corrected Notice of Allowance and Fee(s) Due," issued in connection with U.S. Appl. No. 18/334,197, dated Apr. 2, 2024, 2 pages.

United States Patent and Trademark Office, "Notice of Allowance and Fee(s) Due," issued in connection with U.S. Appl. No. 18/334,197, dated Mar. 11, 2024, 9 pages.

\* cited by examiner

Input: initial camera pose $T_0$

1 foreach *new frame of data $D_t$* do
2    begin Prediction Step:
3       Compute the prediction $\overline{bel}_t$
4       Let $T_t^- := MP(\overline{bel}_t)$ be the most likely pose.
5    end
6    begin Measurement Update:
7       Prepare model and data
8       repeat *starting with* $T_t^{(0)} := T_t^-$, $bel_t^{(0)} := \overline{bel}_t$, *and* $i := 0$
9          Compute correspondences using the most recent estimate of the camera pose $T_t^{(i)}$.     E-STEP
10         Refine the estimate of belief $bel_t^{(i)}$ to obtain $bel_t^{(i+1)}$ assuming the correspondences are fixed.     M-STEP
11         Let $T_t^{(i+1)} := MP(bel_t^{(i+1)})$ and $i := i + 1$.
12       until *convergence*
13    end
14    Provide the new pose estimate $T_t := T_t^{(i)}$ to the mapper or the AR device.
15 end

*FIG. 13*

Example Scaling Series algorithm for belief estimation.

Input: $V_0$ - initial uncertainty region, $\mathcal{D}$ - data set, $M$ - number of particles per $\delta$-neighborhood, $\delta_*$ - terminal value of $\delta$.

1: $\delta_0 \leftarrow Radius(V_0)$
2: $zoom \leftarrow 2^{-1/dimX}$
3: $N \leftarrow \lfloor \log_2(Volume(S_{\delta_0})/Volume(S_{\delta_*})) \rfloor$
4: for $n = 1$ to $N$ do
5:    $\delta_n \leftarrow zoom \cdot \delta_{n-1}$
6:    $\tau_n \leftarrow (\delta_n/\delta_*)^2$
7:    $\overline{\mathcal{X}}_n \leftarrow \text{Even\_Density\_Cover}(V_{n-1}, M)$
8:    $\mathcal{W}_n \leftarrow \text{Importance\_Weights}(\overline{\mathcal{X}}_n, \tau_n, \mathcal{D})$
9:    $\mathcal{X}_n \leftarrow \text{Prune}(\overline{\mathcal{X}}_n, \mathcal{W}_n)$
10:   $V_n \leftarrow \text{Union\_Delta\_Neighborhoods}(\mathcal{X}_n, \delta_n)$
11: end for
12: $\mathcal{X} \leftarrow \text{Even\_Density\_Cover}(V_N, M)$
13: $\mathcal{W} \leftarrow \text{Importance\_Weights}(\mathcal{X}, 1, \mathcal{D})$

Output: $(\mathcal{X}, \mathcal{W})$ - a weighted particle set approximating the belief.

*FIG. 16*

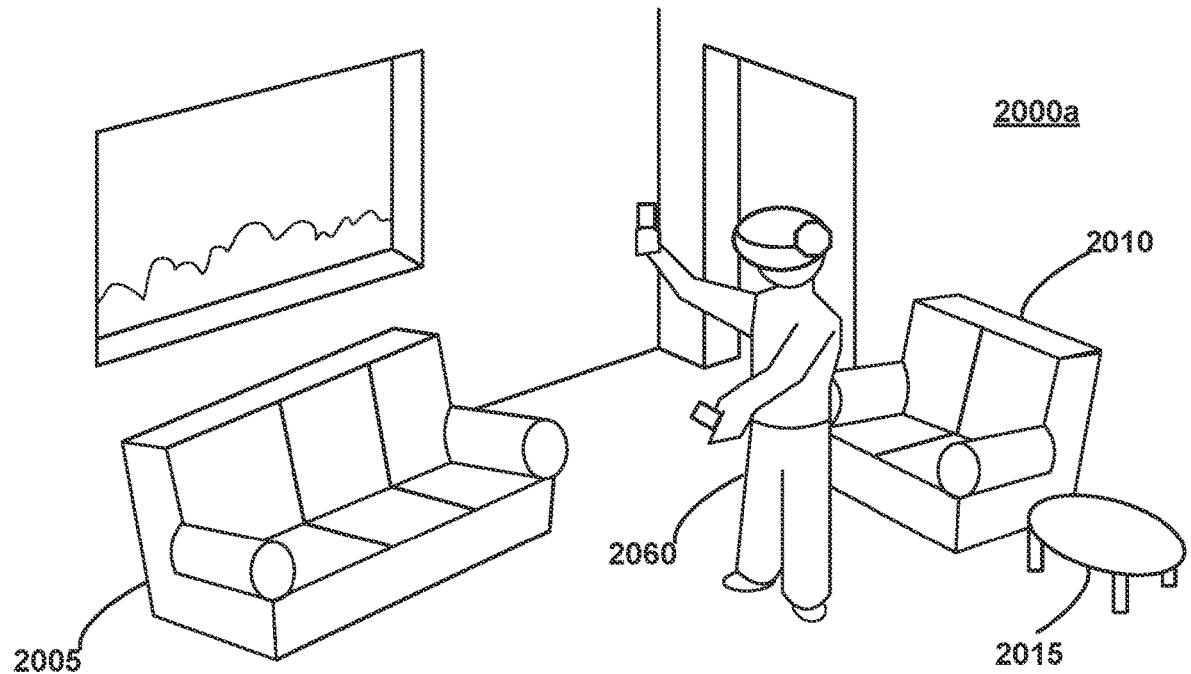
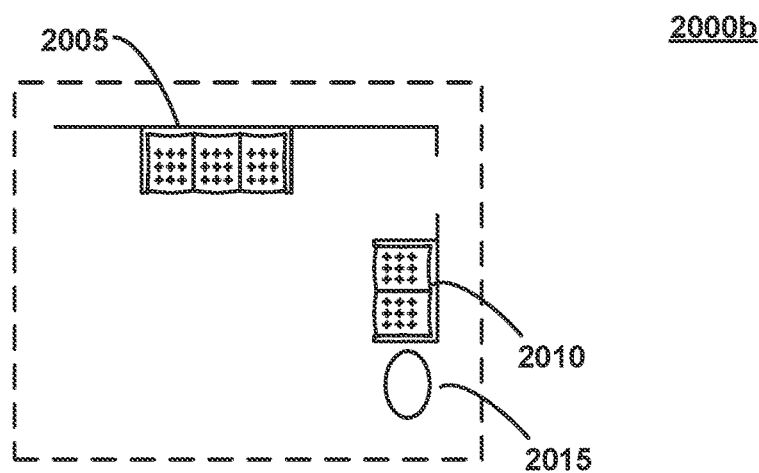
FIG. 20

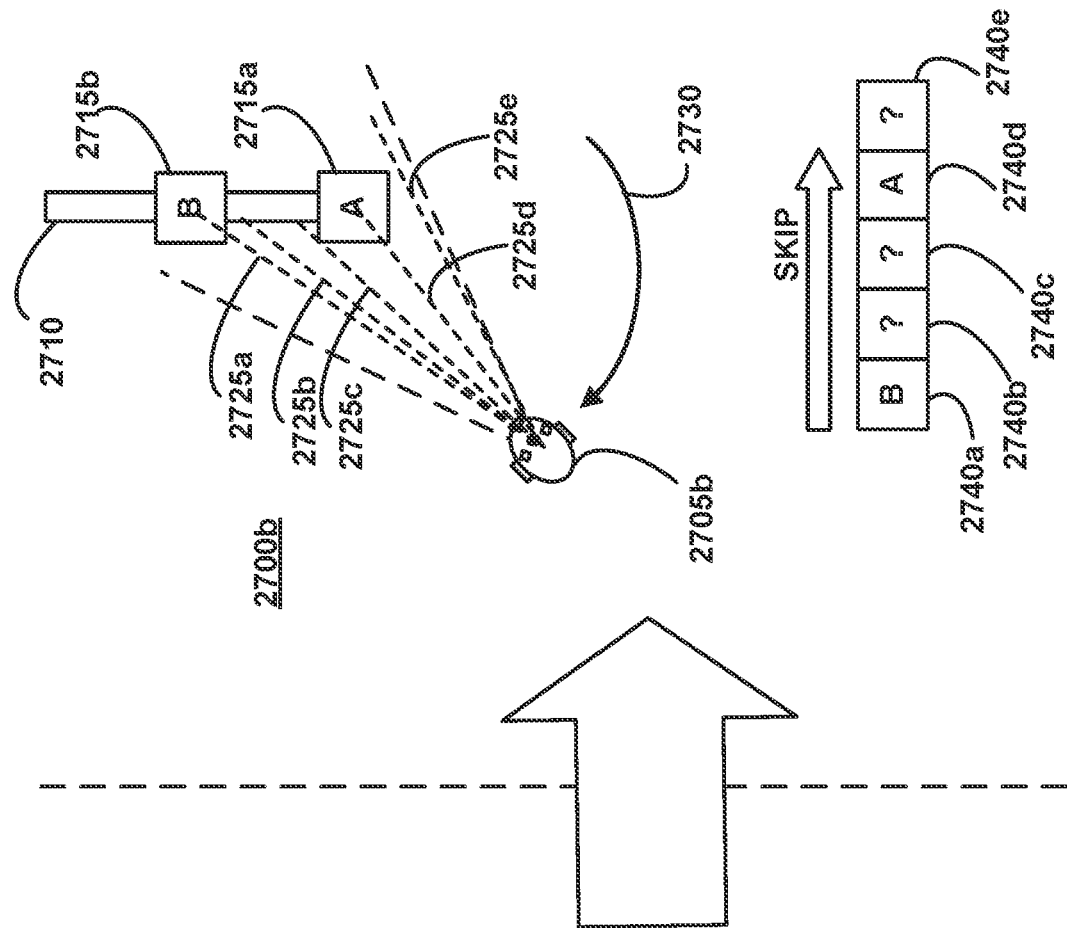
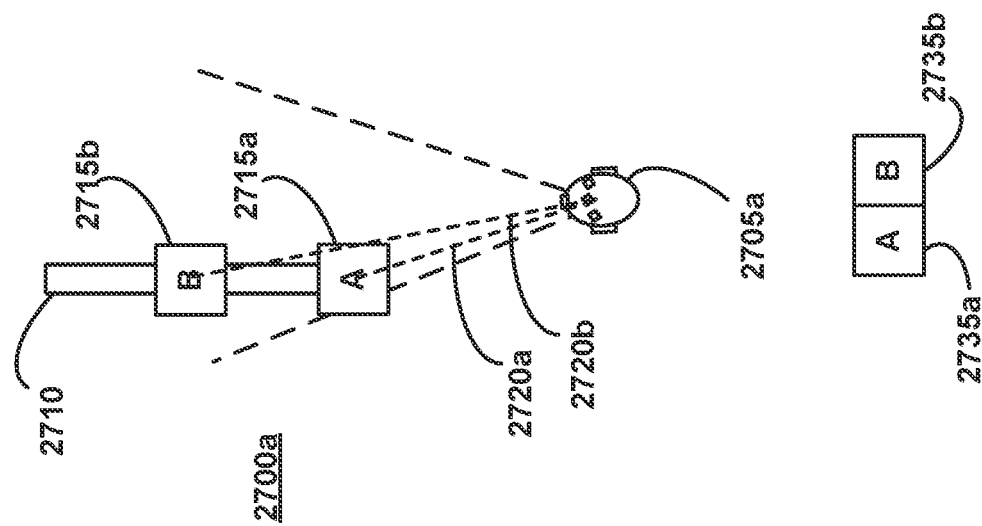
FIG. 27

OPTIMIZING HEAD MOUNTED DISPLAYS FOR AUGMENTED REALITY

CROSS-REFERENCE TO RELATED APPLICATIONS

This patent arises from a continuation of U.S. patent application Ser. No. 17/094,138, entitled "OPTIMIZING HEAD MOUNTED DISPLAYS FOR AUGMENTED REALITY," and filed Nov. 10, 2020, which is a continuation of U.S. patent application Ser. No. 16/706,108, entitled "OPTIMIZING HEAD MOUNTED DISPLAYS FOR AUGMENTED REALITY," and filed Dec. 6, 2019, which is a continuation of U.S. Pat. No. 16,051,099, entitled "OPTIMIZING HEAD MOUNTED DISPLAYS FOR AUGMENTED REALITY," and filed Jul. 31, 2018, which is a continuation of U.S. patent application Ser. No. 15/406,652, entitled "OPTIMIZING HEAD MOUNTED DISPLAYS FOR AUGMENTED REALITY," and filed Jan. 13, 2017, which claims the benefit of and priority to U.S. Provisional Patent Application No. 62/279,604 filed Jan. 15, 2016, as well as U.S. Provisional Patent Application No. 62/279,615 filed Jan. 15, 2016, all of which are incorporated by reference herein in their entireties for all purposes. This application also incorporates herein by reference in their entireties for all purposes U.S. Provisional Patent Application No. 62/080,400 filed Nov. 16, 2014, U.S. Provisional Patent Application No. 62/080,983 filed Nov. 17, 2014, U.S. Provisional Patent Application No. 62/121,486, filed Feb. 26, 2015, as well as U.S. Non-Provisional application Ser. No. 15/054,082 filed Feb. 25, 2016.

TECHNICAL FIELD

Various of the disclosed embodiments relate to optimizations and improvements for head mounted displays.

BACKGROUND

Head Mounted Displays (HMDs) are becoming increasingly popular for augmented reality (AR) and virtual reality (VR) applications. While many AR systems provide "see-through" transparent or translucent displays upon which to project virtual objects, many VR systems instead employ opaque, enclosed screens. These enclosed screens may completely obscure the user's field of view of the real world. Indeed, eliminating the user's perception of the real world may be integral to a successful VR experience.

HMDs designed exclusively for VR experiences may fail to capture significant portions of the AR market. For instance, despite possibly including functionality for capturing and presenting images of the user's real-world field of view, VR headsets may still not readily lend themselves to being repurposed for AR applications. Accordingly, it may be desirable to allow users to repurpose a VR HMD for use as an AR device. Alternatively, one may simply wish to design an AR device that does not incorporate a transparent or translucent real-world field of view to the user. Such HMDs may already include a camera and/or pose estimation system as part of their original functionality, e.g., as described in U.S. Provisional Patent Application 62/080400 and U.S. Provisional Patent Application 62/080983, For example, an immersive VR experience may rely upon an inertial measurement unit (IMU), electromagnetic transponders, laser-based range-finder systems, depth-data based localization with a previously captured environment model, etc. to determine the location and orientation of the HMD, and consequently, the user's head. Accordingly, the disclosed embodiments provide AR functionality for opaque, "non-see-through" HMDs (generally referred to as a VR HMD herein), which may include, e.g., an RGB or RGBD camera.

BRIEF DESCRIPTION OF THE DRAWINGS

Various of the disclosed embodiments may be better understood by referring to the following Detailed Description in conjunction with the accompanying drawings, in which like reference numerals indicate identical or functionally similar elements:

FIG. 13 is a pseudocode listing reflecting one possible Estimation Maximization algorithm as may be implemented in some embodiments;

FIG. 16 is a pseudocode listing reflecting one possible Scaling Series algorithm implementation as may be implemented in some embodiments;

FIG. 20 is a view of a user wearing an HMD in a real-world environment as may occur in various embodiments;

FIG. 27 is a an example orientation transformation illustrating the pixel/vertex skipping that may be applied by the system in some embodiments following pixel/vertex stretching;

Figure 1:
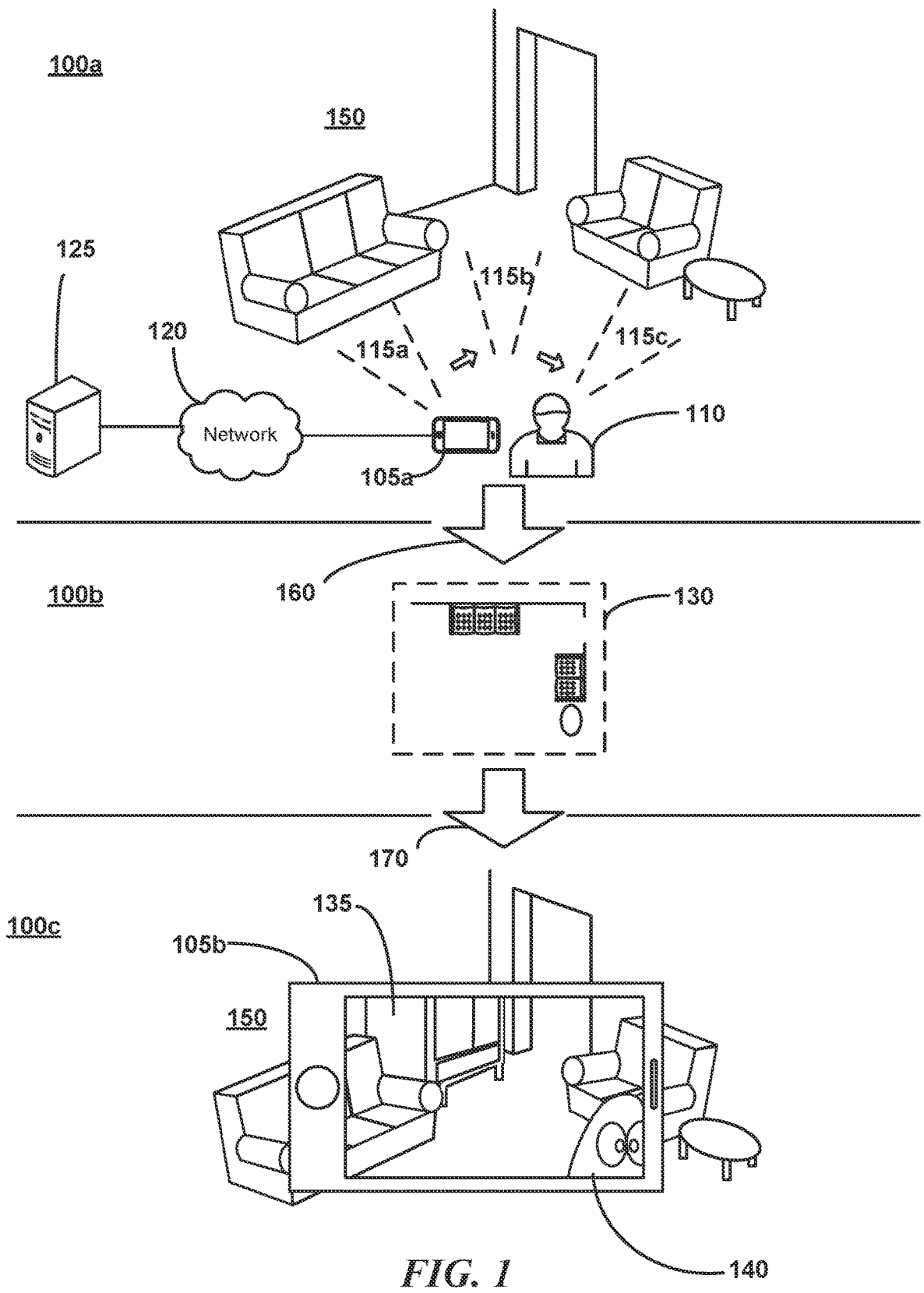
FIG. 1 is a conceptual diagram illustrating an overview of environment data capture, model creation, and model application as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments.

DETAILED DESCRIPTION

Various of the disclosed embodiments relate to optimizations and improvements for head-mounted displays. Some of the embodiments may be enabled by recently developed technology, e.g., the high fidelity and more efficient systems and methods presented in U.S. Provisional Patent Application No. 62/080,400 and U.S. Provisional Patent Application No. 62/080,983. Accurate mapping and localization may facilitate commercial and social interactions that would otherwise be unfeasible.

1. Example AR System Overview—Example System Topology

Various of the disclosed embodiments include systems and methods which provide or facilitate an augmented reality, and in some instances virtual reality, experiences. Augmented reality may include any application presenting both virtual and real-world objects in a user's field of view as the user interacts with the real-world. For example, the user may hold a tablet, headpiece, head-mounted-display, or other device capable of capturing an image and presenting it on a screen, or capable of rendering an image in the user's field of view (e.g., projecting images upon a transparency between the user and the real-world environment), projecting an image upon a user's eyes (e.g., upon a contact lens), but more generally, in any situation wherein virtual images may be presented to a user in a real-world context. These virtual objects may exist persistently in space and time in a fashion analogous to real objects. For example, as the user scans a room, the object may reappear in the user's field of view in a position and orientation similar to a real-world object.

FIG. 1 is a conceptual diagram illustrating an overview of environment data capture, model creation, and model application as may be relevant to some embodiments. Initially 100*a*, a user 110 may scan a capture device 105*a* (illustrated here as a device similar to that depicted in FIG. 4 and discussed in greater detail herein) about an environment 150. The capture device 105*a* may include a depth sensor and may additionally include a camera for capturing photographic images (e.g., some suitable devices for various embodiments include a Kinect® sensor, a Senz3D® sensor, ASUS Xtion PRO®, etc.). Generally, a "camera" as referenced herein refers to a device able to capture depth and/or photographic images. As the user 110 moves the capture device 105*a*, the capture device 105*a* may acquire a plurality of depth frames 115*a*, 115*b*, 115*c* using the depth sensor. Each depth frame may provide depth values for each point in the capture device's 105*a* field of view. This raw data may be recorded on the capture device 105*a* in a data log (including, e.g., depth, RGB, and IMU data) as the user walks through and/or scans the environment 150. The data log may be a file stored on the capture device 105*a*. The capture device 105*a* may capture both shape and color information into a form suitable for storage in the log. In some embodiments, the capture device 105*a* may transmit the captured data directly to a remote system 125 (e.g., a laptop computer, or server, or virtual server in the "cloud", or multiple servers e.g. in the "cloud") across a network 120 (though depicted here as communicating across a network, one will recognize that a portable memory, e.g., a USB memory stick, may also be used). In some embodiments, the data may be transmitted in lieu of local storage on the capture device 105*a*. Remote system 125 may be at the same location or a different location as user 110. An application running on the capture device 105*a* or on a remote system 125 in communication with the capture device 105*a* via a network 120 may integrate 160 the frames in the data log to form a three-dimensional internal model representation 130 (e.g., one or more vertex meshes represented here in a top-down view 100*b*). This integration, also referred to as "mapping" herein, may be performed on the capture device 105a or on the remote system 125 or on a combination of the two. The capture device 105a may also acquire a photographic image with each depth frame, e.g., to generate textures for the map as described herein.

An augmented reality (AR) device 105b (which may be the same as the capture device 105a) may then use 170 the model 130 in conjunction with incoming depth frame data to present an augmented reality experience 100c. For example, a user (perhaps the same user as user 110) may hold the AR device 105b in view of the environment 150. As real-time RGB images are captured of the environment 150 and displayed on the AR device 105b, the AR system may supplement the images with virtual elements (the real-time images may be converted to a textured mesh in some embodiments as described herein). For example, here a virtual piece of furniture 135 appears behind a real-world sofa. Similarly, a virtual character 140 is presented in the scene as though it were standing in the real-world environment (rotating the device to the right and downward may bring the character fully into view). The AR device 105b may have more than one camera (e.g. to provide a stereoscopic experience) and the AR system 105b may modify each separate camera image mutatis mutandis (though the capture device 105a, e.g., may have had only one camera).

The model 130 may also be used in a standalone capacity, e.g., for creating a virtual world mimicking the real-world environment, or for performing measurements of the real-world environment independent of any augmented reality application. Though depicted here in a home environment, one will recognize that the same systems and methods may be applied in other settings, e.g., an office or industrial environments, inside an animal body, etc.

In order to display virtual objects (such as virtual piece of furniture 135 and virtual character 140) faithfully to the user, some embodiments establish: (a) how the camera(s) on the AR device 105b are positioned with respect to the model 130, or object, or some static reference coordinate system (referred to herein as "world coordinates"). Some embodiments also establish (b) the 3D shape of the surroundings to perform various graphics processing applications, e.g., to properly depict occlusions (of virtual objects by real objects, or vice versa), to render shadows properly (e.g., as depicted for virtual piece of furniture 135 in FIG. 1), perform an Artificial Intelligence operation, etc. Problem (a) is also referred to as the camera localization or pose estimation, e.g., determining position and orientation of the camera in 3D space.

Various of the disclosed embodiments employ superior methods for resolving how the camera (eyes) are positioned with respect to the model or some static reference coordinate system ("world coordinates"). These embodiments provide superior accuracy of localization, which mitigate virtual object jitter and misplacement—undesirable artifacts that may destroy the illusion to the user of a virtual object being positioned in real space. Whereas prior art devices often rely exclusively on special markers to avoid these issues, those markers need to be embedded in the environment, and thus, are often cumbersome to use. Such markers may also restrict the scope of AR functions which may be performed.

In contrast to the previous AR solutions, many of the disclosed embodiments provide, e.g.: operation in real time; operation without user intervention; display of virtual objects in a correct location and without jitter; no modification of the environment or other cumbersome preparations; occlusions and shadows on-the-fly; presentation to a user in an easy-to-use package (e.g. smart phone, tablet, or goggles); can be produced at consumer-friendly prices; etc. One will recognize that some embodiments may present only some or none of these features.

Figure 2:
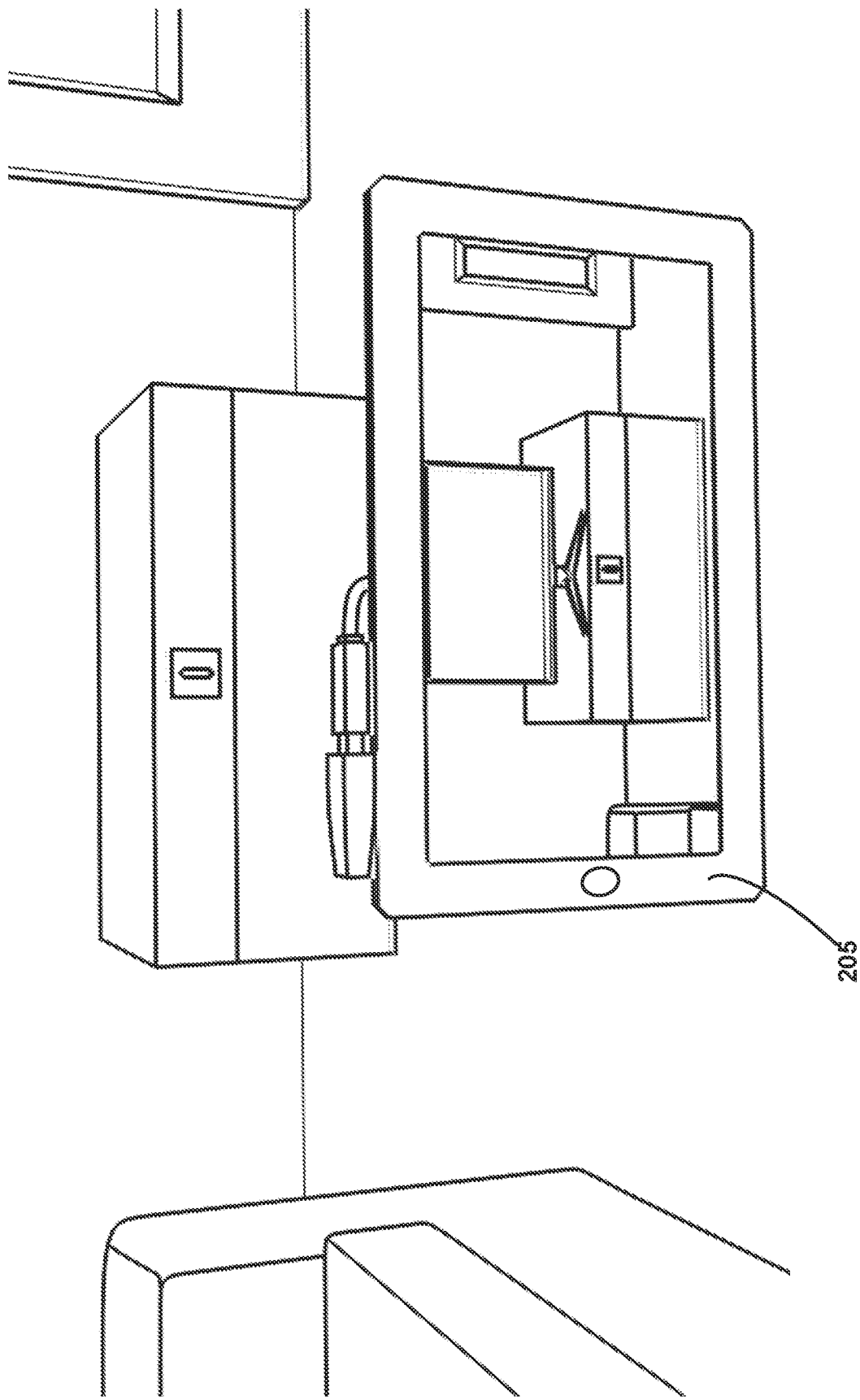
FIG. 2 is an image of an example tablet device implementing a portion of an AR system as may be used in some embodiments.

As an example, FIG. 2 is a recreation of a photograph of an embodiment in operation, wherein a virtual television playing a home video is depicted atop a real-world piece of furniture in an AR device 205. The TV does not actually exist in the real-world, but a user viewing their surroundings with AR device 205, may not be able to distinguish between real and virtual objects around them.

Figure 3:
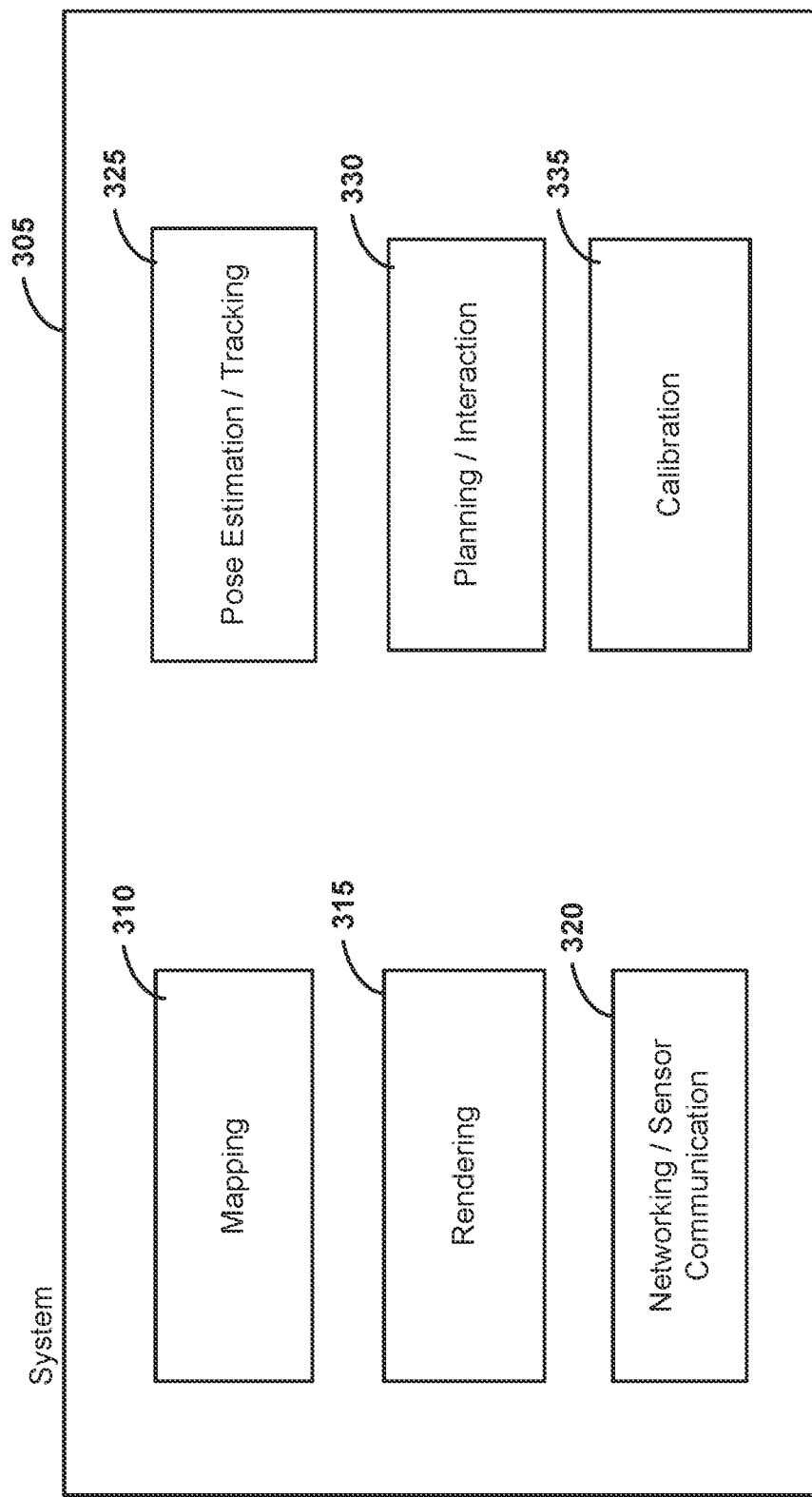
FIG. 3 is a block diagram of various components appearing in a system as may be implemented in some embodiments.

FIG. 3 is a block diagram of various components appearing in a mapping and AR system as may be implemented in some embodiments (though the mapping and AR systems may exist separately in some embodiments). These operational components may consist of the following sub-systems: mapping 310; pose estimation/tracking 325; rendering 315; planning/interaction 330; networking/sensor communication 320; and calibration 335. Though depicted here as components of a single overall system 305, one will recognize that the subcomponents may be separated into separate computer systems (e.g., servers in a "cloud" network), processing functions, and/or devices. For example, one system may comprise a capture device. A second system may receive the depth frames and position information form the capture device and implement a mapping component 310 to generate a model. A third system may then implement the remaining components. One will readily recognize alternative divisions of functionality. Additionally, some embodiments are exclusive to the functions and/or structures associated with one or more modules.

Similarly, though tracking is discussed herein with reference to a user device to facilitate explanation, one will recognize that some embodiments may implement applications using data captured and processed using the disclosed techniques in alternate form factors. As just one example, depth or other sensors may be placed about a user's house and a device for projecting images on a contact lens provided. Data captured using the disclosed techniques may then be used to produce an AR experience for the user by projecting the appropriate image onto the contact lens. Third party devices may capture the depth frames of a user's environment for mapping, while the user's personal device performs the AR functions. Accordingly, though components may be discussed together herein to facilitate understanding, one will understand that the described functionality may appear across different functional divisions and form factors.

2. Example Combined Capture and Augmented Reality Device

Figure 4:
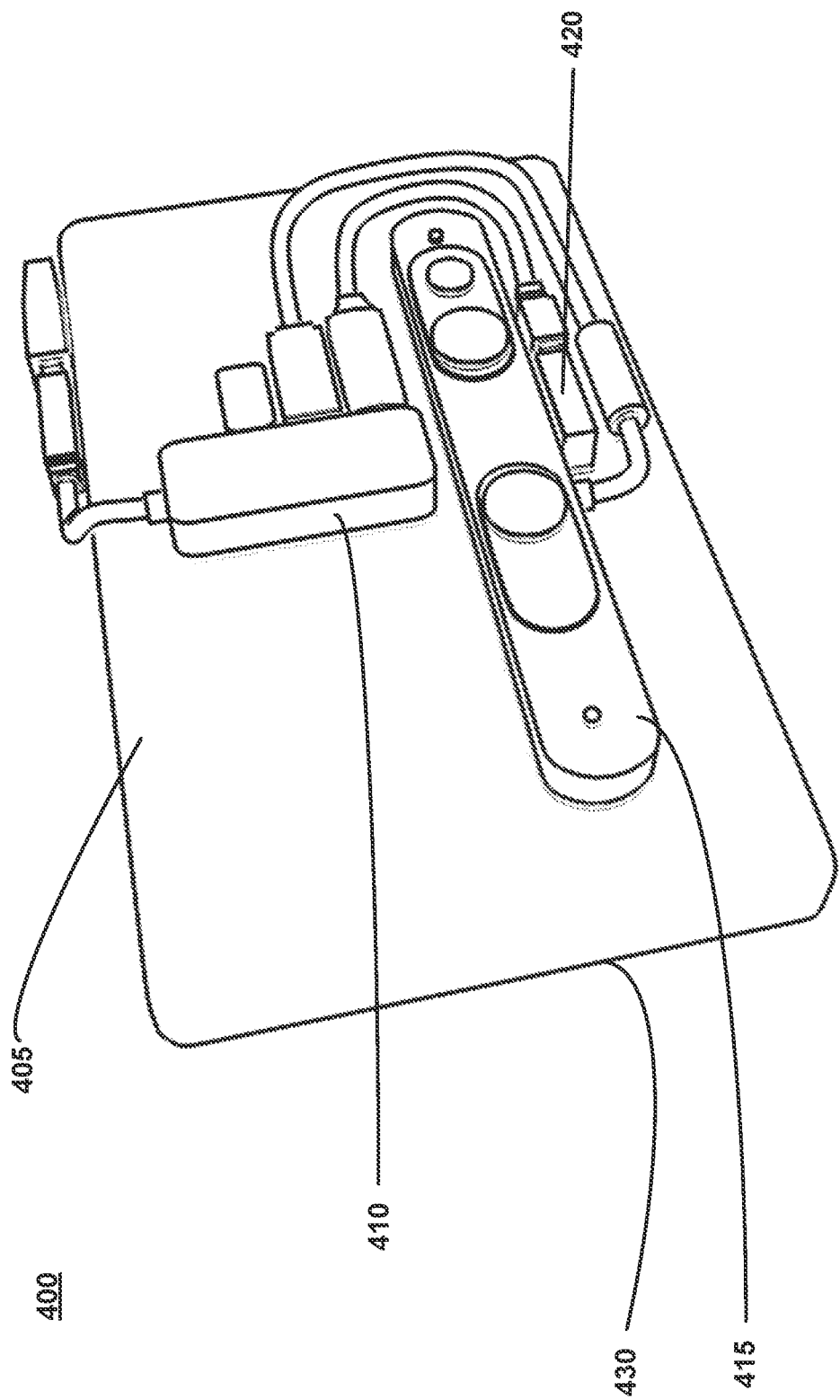
FIG. 4 is a perspective view of example mapping and AR device as may be used in some embodiments.

FIG. 4 is a perspective view of example mapping and application device 400 as may be used in some embodiments. Various embodiments may be implemented using consumer-grade off-the-shelf components. In some embodiments, the AR device consists of a tablet, to which an RGBD camera and optionally an IMU have been attached. As depicted, the example device comprises a tablet personal computer 405, with the panel opposite the display attached to a USB hub 410, RGBD camera 415, and an Inertial Measurement Unit (IMU) 420. Though the IMU 420 and camera 415 are here depicted as separate from the tablet's 405 form factor, one will readily recognize variations wherein the IMU 420, camera 415, and tablet personal computer 405 comprise a single form factor. A touch-screen display 430 (not shown) may be provided on the opposing surface of the tablet. Though shown here separately from the display device, the camera and IMU may be available in embeddable form, and thus could be fitted inside a tablet in some embodiments. Similarly, where a headset display (e.g., a virtual or augmented reality system) is used, the depth-sensor, camera, and/or IMU may be integrated into the headset. Hence, the device can take on multiple forms, e.g., a tablet, a head-mounted system (AR/VR helmet or goggles), a stand-alone device, or a smart phone. Various of the disclosed embodiments, or aspects thereof, may be implemented in software, hardware, and/or firmware (e.g., a system on a chip, an FPGA, etc.).

In one example implementation, a Razer Edge Pro® Tablet may be used as the capture and/or AR device. An example RGBD Sensor used for capture and/or for AR may be an ASUS Xtion PRO LIVE® or a Primesense® camera. An example IMU sensor which may be used is a "VectorNav VN100"®. This example configuration may also include a 4-port USB hub. For computations on a separate device, a Dell Alienware laptop® (implementing, e.g., a Dual GeForce GTX 880m GPU) may be used.

As mentioned, the mapping and AR device need not be the same device as depicted here. For example, a device without a display may be used to acquire the depth frame data. A head mounted display may be used as a combined mapping and AR device, or as just one or the other.

3. Example Workflow Overview

Figure 5:
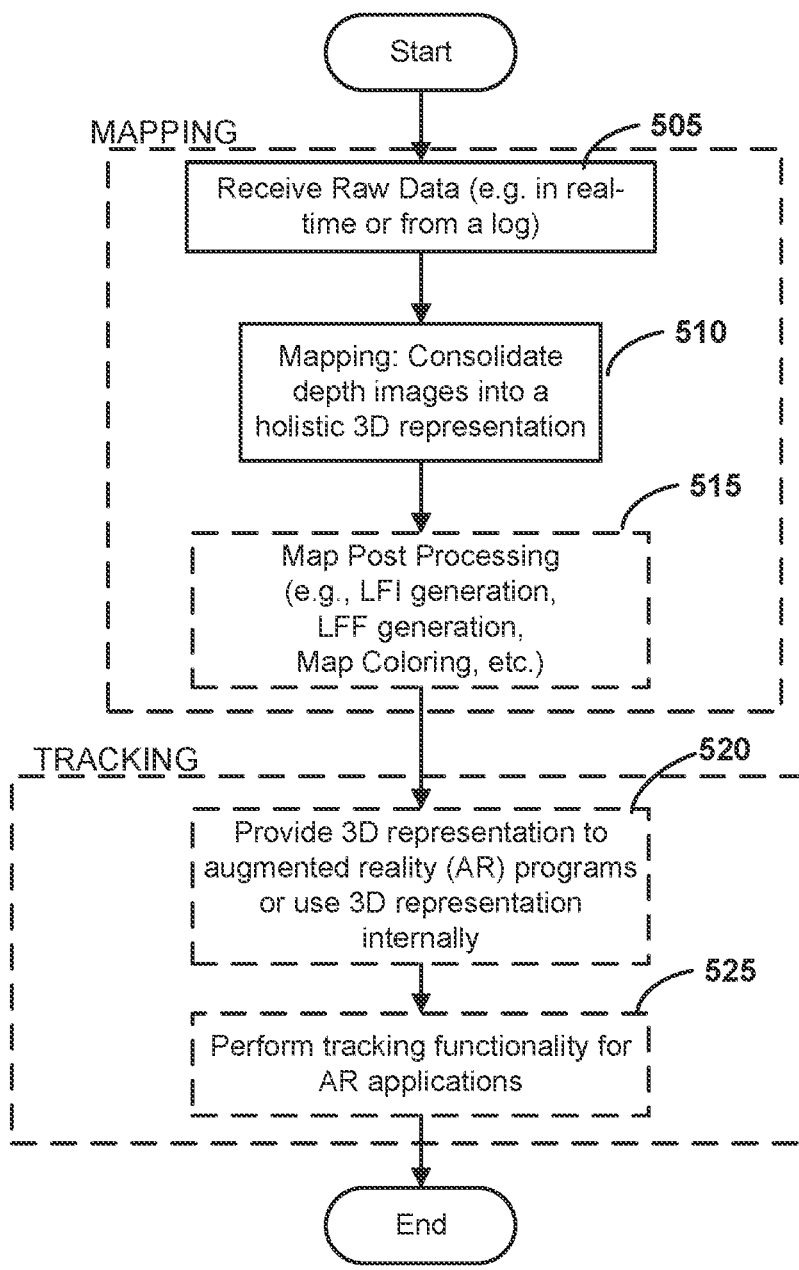
FIG. 5 is a flow diagram generally depicting an overview of various steps in a mapping and tracking process as may be implemented in some embodiments.

Many of the disclosed features are found in the system operations, which may appear as software, firmware, hardware, or a combination of two or more of these (e.g., the implementation could be done on-chip). The general processing and application pipeline may occur as depicted in FIG. 5. At block 505, a mapping system may receive the raw depth frame, image frame, and/or capture device orientation data (e.g., inertial measurement unit data including, e.g., acceleration, gyroscopic, magnetometer data, etc.). This data may be received from a log created by a capture device (previously), or in a real-time delivery from the capture device. The environment may be scanned by a user walking through the environment with the capture device. However, variations where a device moves itself or rotates itself (e.g., where the device is located on a robot or animal) to capture multiple depth frames will also be recognized. The capture device may record location information (accelerometer, and/or gyroscopic, and/or magnetometer, and/or GPS data, encoder data, etc.), a depth frame, and possibly a visual image frame with each capture.

At block 510, mapping generation operations may be performed using the acquired raw data. For example, a mapping system may generate a vertex mesh reflecting the environment based upon depth data. In some embodiments, the resulting maps are represented as polygonal meshes with colored vertices or with textures (though other representations, e.g., voxels, will be readily recognized).

At block 515, the mapping system may also apply any desired post-processing operations, e.g., map coloring. Post processing may also involve the creation of data structures facilitating tracking as discussed in greater detail herein. For example, an LFI and an LFF representation of the map may be created (in some embodiments, only one or both of these representations are created and there is no separate vertex "map").

At block 520, the system may provide the 3D representation, e.g., the 3D vertex mesh and/or LFF and LFI structures, to an AR system. For example, a development toolkit may be provided to the AR developer, allowing them to access the 3D representation.

The AR developer's application may also have access to tracking routines at block 525. These tracking routines may allow the AR program to determine the pose of an AR device in the environment represented by the 3D representation. In some embodiments, the mapping sub-system produces 3D models ("maps") of the environment, which may be used during tracking. The generated maps may be highly detailed and accurate. As the user views the environment through the device, the tracking sub-system may compute the precise camera pose in real time. This pose, the 3D model, and other 3D data (e.g., virtual object models), may then be used by the rendering sub-system to display altered environment to the user in real time. Though tracking and mapping are depicted separately here, one will recognize that during tracking the capture frames may be used to perform mapping functions, e.g., to update or augment an existing map.

A planning and interaction sub-system may also use pose, model, and data to compute interactions between virtual and real-world object, to make decisions for virtual characters (e.g., plan trajectories), and to perform other virtual-real-world interactive functionality.

Example applications include: room organization (identifying and highlighting displaced items, e.g., for security, safety, or child development purposes); shopping (e.g., virtual placement to assess furniture before purchase); interior decorator/redecorator; remodeling (e.g., to virtually assess a change to an environment); video games (Real-Time Strategy, First-Person-Shooter, etc.); education (e.g., learning new languages by encountering words in relation to objects in the environment); etc.

4. Concept Summary for Some Embodiments

Figure 6:
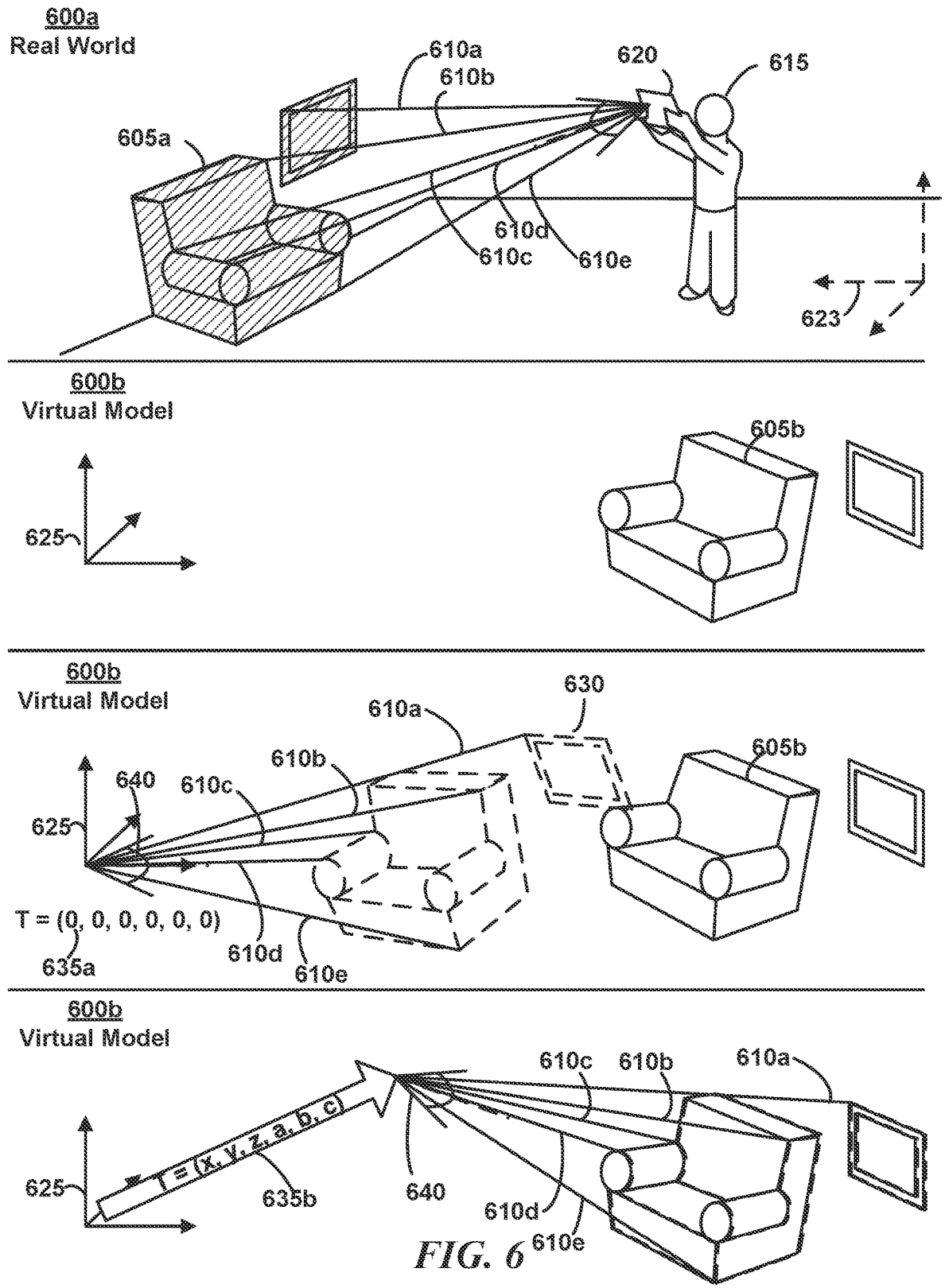
FIG. 6 is a conceptual diagram illustrating a transform representation of a pose as may be used in some embodiments.

To facilitate an understanding of the terminology used in this disclosure, FIG. 6 is a conceptual diagram illustrating a transform representation of a pose as used in some embodiments. Particularly, imagine a situation where a user 615 stood before a chair 605a in the real world 600a, held a capture device 620 above their head, and captured a depth frame having values 610a-e while looking down upon the chair 605a.

The user may have previously created, or be in the process of creating, a virtual model 600b of all, or a portion, of the real-world environment 600a. In this example, the virtual model already includes a virtual representation of the chair 605b (e.g., as a TSDF or vertex mesh) which corresponds to the real world chair 605a. The virtual representation 600b may be stored in a computer. The virtual model has an origin 625 relative to which objects, such as the chair 605b may be oriented. While there is no "central frame of reference" in the physical world to facilitate understanding, one may consider a "real-world" coordinate frame having an origin 623. Some embodiments may make a one-to-one correspondence between real-world coordinate frame 623 and virtual coordinate frame 625. Accordingly, they may each be referred to as a "world coordinate frame" variously herein. Thus, relative to the origin 625 of the virtual environment, the representation of the chair 605b may be located at the indicated position, which would correspond to where the real-world chair 605a is located in relation to the real-world coordinate origin 623 (one will recognize that the particular origin placement in this example is merely to facilitate understanding).

The system may seek to determine the pose of the capture device 620 relative to the world coordinate frame 623 when the depth frame having depth values 610a-e was captured (in some embodiments). This capture device pose may be estimated by fitting or aligning the depth data to the virtual model. To facilitate understanding, assume that the system naively may assume that the depth values 610a-e were generated when the capture device was at the origin 625, in an unrotated position. This may correspond to a naïve transform 635a of the depth values that involves no rotation or translation. As illustrated, this assumption would result in an incorrect alignment 630 of the depth values.

Thus, the system may seek to identify a more appropriate transform 635b of the depth values 610a-e. This improved transform 635b (a translation and/or rotation of the depth frame values 610a-e) will better reflect the position and orientation of the capture device 620 relative to the virtual coordinate frame 625, which would serve as an estimate of the transform between the pose of the device 620 and world coordinate frame 623, when the depth frame with values 610a-e was captured. As the "transformation" represents the transformation between the pose 640 of the device 620 and the world coordinate frame 623 and virtual model origin 625, the terms "pose" and "transform" are used interchangeably herein.

Thus, though the icon 640 may be used herein to refer to a "pose", one will recognize that the "pose" may also be represented as a transform, e.g., relative to a world coordinate frame, or any other suitable coordinate frame. Camera poses may be represented by rigid transformations in 3D with respect to the world coordinate frame. A starting pose may be referred to as $T_0$ herein and a camera pose at time t by $T_t$.

Figure 7:
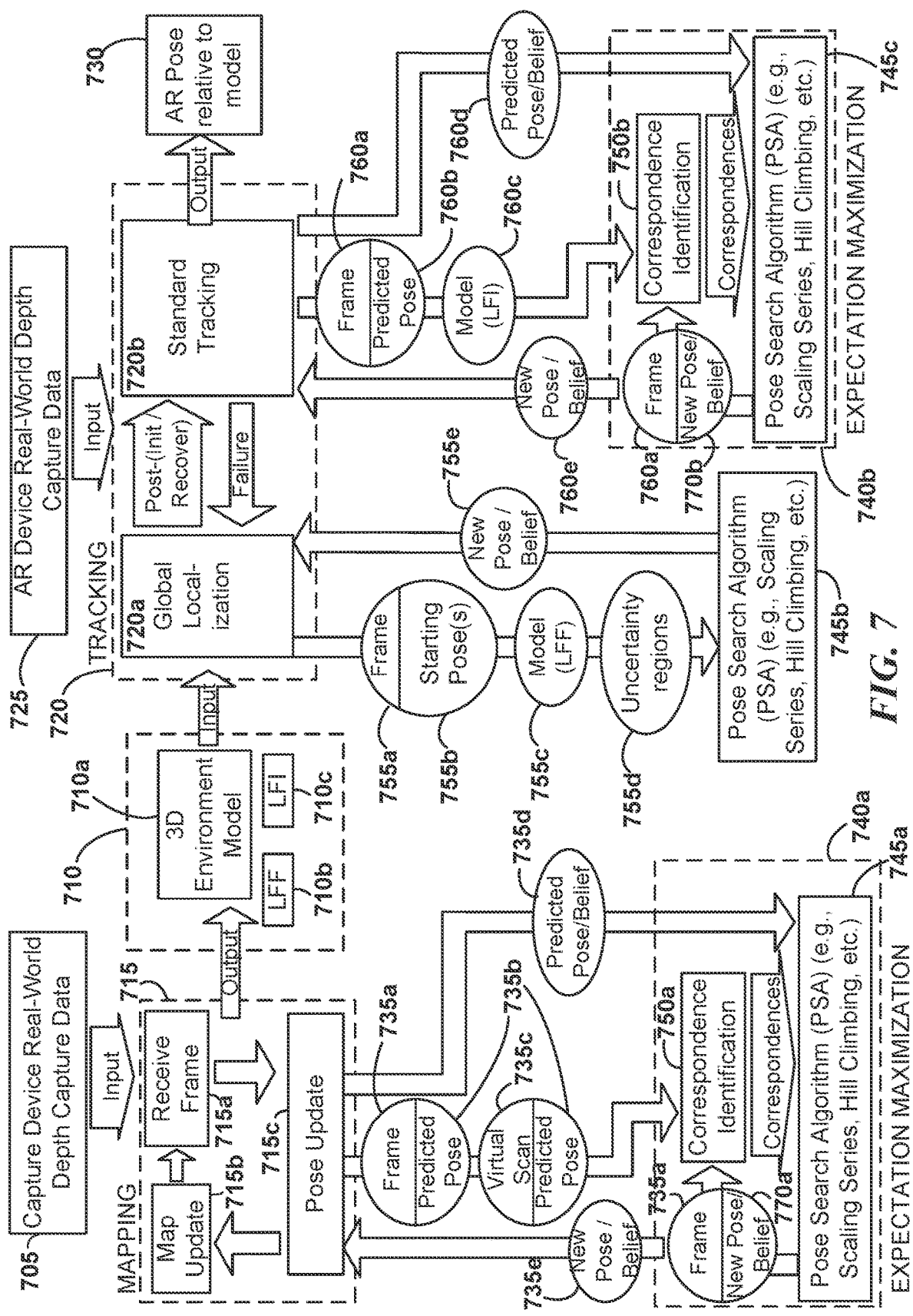
FIG. 7 is a conceptual block diagram of the relations between various concepts relevant to some embodiments.

FIG. 7 is a conceptual block diagram of the relations between various concepts relevant to some embodiments. Generally, at a high level, depth capture data 705 from a capture device may be provided in a log file or in real time to a mapping system 715. The mapping system may generate a plurality of outputs 710, e.g., a 3D model 710a (such as a vertex mesh) of the environment, an optimized LFF representation 710b, and an optimized LFI representation 710c (e.g., as described in greater detail herein, either initially or during post-processing).

These outputs 710 may be used by a tracking system 720. During an AR session, an AR device may provide real-world depth information 725 (e.g., a depth frame taken when the AR device is in some pose in the real world) to the tracking system 720. The tracking system 720 may then determine a pose of the AR device relative to the 3D model 710a corresponding to the AR device's real-world pose based upon the depth data 725. The tracking system 720 may provide this pose information as output 730 to the AR application.

Tracking system 720 may include a Global Localization system 720a and a Standard Tracking system 720b ("Standard" here referring to the frequently repeated character of some operations in some embodiments, rather than any preexisting standard of operation known in the art). The Global Localization system 720a may, e.g., be used to determine the AR device's pose relative to the model when the AR device is first used in the environment (e.g., when the first frame is received) or when the AR device is lost (e.g., when the user relocates the device more quickly than expected to a new pose, or if the sensor was covered or too close to an object for the sensor to receive appropriate depth data, or the data is misleading). One will recognize that Global Localization may be used for other purposes as described herein (e.g., for standard tracking operations, in instances where a dynamics model is unavailable, etc.). Following initialization, standard tracking operations may be performed in the Standard Tracking system 720b. These standard tracking operations may result in the generation of the AR pose data 730.

The Mapping system 715 may be composed of a Map Update process 715b and a Pose Update process 715c. The Pose Update process 715c and the Map Update process 715b may be applied iteratively as frame data 715a is considered (e.g., as frame data is pulled from a stored log or as the frames are generated at a capture device). The Map Update process 715b may construct a map representation (e.g., a TSDF representation) while the Pose Update process 715c determines a proper pose relative to the incomplete map at which to consider the incoming frame data 715a. The first Map Update may be performed from a default, or user-specified pose, rather than using the Pose Update determined pose.

Both the Mapping system 715 and the Tracking system 720 each may refer to a Pose Search Algorithm (PSA) 745a, 745b, 745c (Scaling Series is one example of a PSA, but other examples, e.g., Hill Climbing or Optimization Search will be recognized) to identify a new pose (e.g., a transform) 735e, 755e, 760e (also referred to as a "final pose" in various instances herein) which more correctly places the depth frame data with respect to the virtual representation (and, by correspondence, the correct position in the real-world coordinate frame). For example, the "predicted pose" 735b, 760b may be the system's initial, approximate pose (e.g., the most likely pose for the predicted belief as discussed in greater detail herein) for the frame data in the virtual environment. The PSA 745a, 745b, 745c may determine a more appropriate rotation and translation based on this estimate. Though depicted separately here, in some embodiments two or more of PSAs 745a, 745b, 745c may be the same PSA (and may be implemented using the same hardware/firmware/software). In some embodiments, the belief of the pose 735d and 735e may be a probability distribution, referred to herein as a "belief" (e.g., a distribution of probabilities across a corpus of candidate pose transforms). In some embodiments (e.g., where the PSA is a hill climber), the belief 735d and 735e may instead be represented by a single transform. This single transform may be the pose used to create the virtual scan 735c and the predicted pose for the frame 735a (for use by, e.g., correspondences). Where a probability distribution is used, e.g., the most likely candidate transform may be used as the pose to create the virtual scan 735c (e.g., if the belief is represented by a Gaussian probability distribution, the most likely pose would be the mean). As discussed herein, the belief may be represented by a particle system. When using a belief represented, e.g., by particles, samples, grids, or cells, it may be possible to select a single transform in many ways. For example, one could take the highest weighted particle (if weights are available), take the mean of some or all particles, use a Kernel Density Estimation to determine most likely pose, etc. Where poses are used directly, rather than derived from a belief, in some embodiments, the poses may be accompanied by "search regions" directing the PSA where and/or how to limit its search.

Similarly, the belief 760d used in Standard Tracking may also be represented by a single transform or distribution, and this transform, or the most likely candidate of the distribution, may also be used as the predicted pose 760b. In some embodiments (e.g., as discussed in greater detail herein below), the belief 735d and 735e may be represented as a collection of regions of possible poses and their likelihoods as derived, e.g., from a dynamics model (using IMU data, timestamps, etc.), or as determined by PSA.

The Pose Update process 715c and the Standard Tracking process 720b may apply the PSA 745a, 745c as part of an Expectation Maximization (EM) process 740a, 740b. The EM processes 740a, 740b may iteratively refine an intermediate belief and/or pose determination 770a, 770b (derived initially from the belief and/or predicted pose 735b, 735d, 760b, 760d—again the pose 735b is the same as, or derived from pose/belief 735d and pose 760b is the same as, or derived from pose/belief 760d) to determine a refined, final pose/belief to be returned 735e, 760e. The "expectation" refers to the correspondence identification process 750a, 750b which may determine correspondences between the frame data and the model data (either virtual scan 735c or the model 760c) using the most recent pose determination 770a, 770b. The "maximization" may refer to the application of the PSA 745a, 745c to identify a more refined belief and a more appropriate pose 770a, 770b with which to perform the correspondence. Hence, one "maximizes" (e.g., improves) the alignment of the depth data to the model given "expected" pose correspondences. Again, though they are depicted separately here the EM processes 740a, 740b may be the same, or implemented on the same device, in some embodiments.

In contrast to the EM systems, the Global Localization process 720a may refer directly to a PSA 745b without seeking an iteratively determined optimal fit or fixing the correspondences prior to running the PSA. This may be because Global Localization process 720a seeks to find the pose when considering large portions of the model—attempting to find a correspondence between the frame data and the model as a whole may not be useful. An LFF data structure may already reflect relations between "corresponding" points.

With regard to the Pose Update process 715c, the Pose Update process 715c may generate a depth frame representation of the incomplete map construction called, herein, a virtual scan 735c. The virtual scan 735c may be generated from the perspective of a predicted pose 735b. Initially, the current frame depth data 735a may also be assumed to be taken at the predicted pose 735b (e.g., as the system in FIG. 6 naively assumed the data was taken at the origin, though the predicted pose 735b may be a much better estimate in many embodiments). The virtual scan 735c, predicted pose 735b, and frame depth data 735a may be provided to the correspondence identification process 750a. The frame depth data 735a may be subsampled in some embodiments.

In some embodiments, any points/pixels contained in a "border" area (around the edge of the captured depth image, where the edge could be of some pixel width, e.g., constant, or some distance after skipping any part of the edge where there are no pixels containing depth data, etc.) may be filtered out, or removed from consideration, and hence not considered by the correspondence identification 750a process. This would reduce the amount of previously unseen "new data" appearing in a depth frame relative to a previously acquired and processed depth frames. Note that border filtering may be applied to the frame depth data during Correspondence Identification 750a during Pose Update 715c process, but need not be applied during Map Update 715b, or Standard Tracking Correspondence Identification 750b in some embodiments.

The process 750a may determine which depth values in the virtual scan 735c correspond to the depth values in the frame data 735a (as depth "values" correspond to "points" in space in accordance with their pixel position, the terms depth values and depth points may be used interchangeably herein). Given these correspondences, the PSA 745a may seek a pose (and refined belief in some embodiments) 735e for the frame data 735a that brings the corresponding points closer together.

The PSA 745a may use the predicted belief/pose to constrain its search. The determined pose 770a may then be used in the next correspondence determination to better identify corresponding depth points in the virtual scan 735c and in the frame data 735a. This process 740a may continue until a best resulting belief and determined pose 735e is generated. Note that the virtual scan 735c remains as a representation at the predicted pose 735b in each iteration, but the frame data 735a is reconsidered at the new most likely pose 770a during each EM iteration.

With regard to the Standard Tracking process 720b, some embodiments may generate a virtual scan 735c, and for some embodiments the Standard Tracking process 720b may, instead of generating a virtual scan, or in addition to creating a virtual scan, have access to a model of the environment, e.g., in an LFI representation 760c. A recently captured frame 760a, a predicted pose 760b, and the LFI representation 760c may be provided to the correspondence identification process 750b to identify points in the model 760c corresponding to the frame depth values 760a. The frame 760a may be subsampled in some embodiments. Given these correspondences, the PSA 745c may seek a pose (and in some embodiments, a refined belief) for the frame data 760a that brings the corresponding points closer together. Again, the PSA may make this determination with reference to the predicted pose/belief 760d. The determined pose 770b may then be used in the next correspondence determination to better identify depth values in the LFI representation 760c corresponding to the depth values in the frame data 760a. This process 740b may continue until a best determined pose/belief 760e is generated. Like the virtual scan, the LFI representation 760c does not change with each iteration.

With regard to the Global Localization process 720a, the Global Localization process 720a seeks to determine the AR device's pose relative to the entire model. As the model may be large, a low fidelity determination may be made by the Global Localization process 720a (and a subsequent high fidelity determination made later by the Standard Tracking process 720b). In some embodiments, the frame data may be subsampled for each of the Pose Update, Global Localization, and Standard Tracking operations, though the frame data may be subsampled to a greater degree for Global Localization as compared to Pose Update and Standard Tracking.

Global Localization process 720a may provide a frame 755a to the PSA 745b. When the AR device initializes, frame 755a may be the first frame captured. When the device is lost, or unsure of its pose, frame 755a may be the last viable frame that was captured. The frame 755a may be subsampled to speed the search process. The frame 755a may be associated with one or more "starting poses" 755b and uncertainty regions 755d. In some embodiments, the starting search poses 755b may have been determined when the model was generated (e.g., the Mapping system 715 may have identified rooms and placed a starting pose at the center of each room). The starting poses 755b may be considered sequentially or in parallel as discussed in greater detail herein by one or more PSA 745b instances. An LFF representation 755c of the model may also be provided to PSA 745b. A single uncertainty region 755d covering the entire model may be used in some embodiments, or multiple uncertainty regions 755d large enough such that the union of the starting poses with their corresponding uncertainty regions 755d will cover the entire model. The PSA 745b may identify a belief and a most likely pose 755e that relocates the frame data 755a to a position better matching the LFF model 755c data. Where multiple PSA instances are applied, e.g., in parallel (e.g., one instance for each starting pose), the Global Localization process 720a may select the best of the resulting poses 755e and, in some embodiments, the corresponding belief, or in other embodiments the combined belief.

One will recognize variations to the figure for various embodiments. For example, some embodiments do not apply Expectation Maximization for the Pose Update and Standard Tracking. In these instances, each of the Pose Update, Standard Tracking, and Global Localization may reference a PSA directly.

Figure 8:
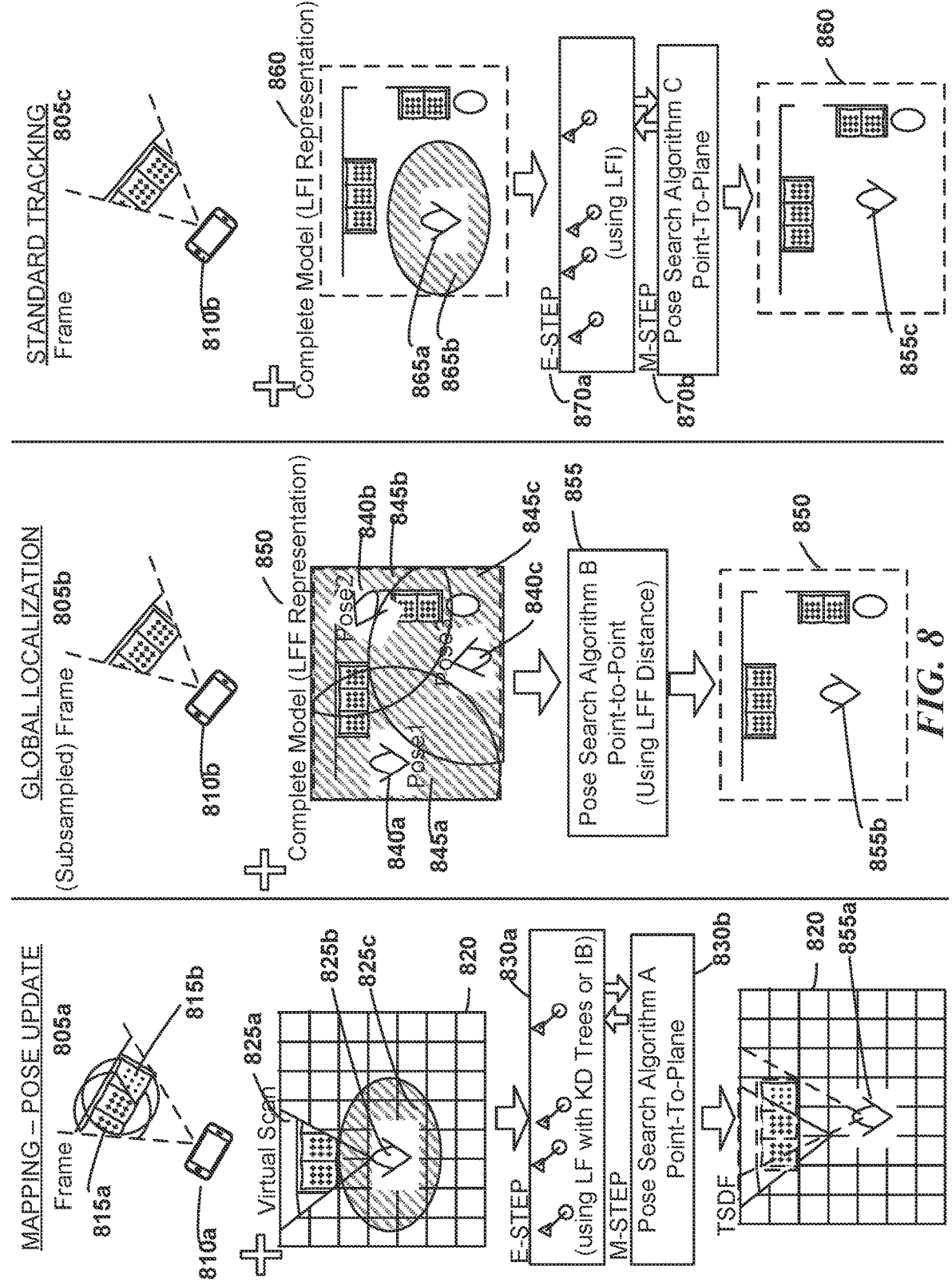
FIG. 8 is a series of inputs, configurations, and outputs as may be applied to a Pose Search Algorithm (PSA) for Mapping, Standard Tracking, and Global Localization, as may occur in some embodiments.

To facilitate a visual understanding of the Pose Update, Global Localization, and Standard Tracking's use of their respective PSAs, FIG. 8 reflects a series of inputs, outputs, and configurations as may be applied in some embodiments. With respect to the Pose Update in the Mapping process, a frame 805a of depth values in the field of view of a capture device 810a may be provided to an EM process comprising an E-step 830a (correspondence determination) and an M-Step 830b (application of the PSA to find an improved belief and its most likely pose). The frame 805a may include depth values 815a corresponding to previous captures which are now represented in an intermediate representation 820 (e.g., a TSDF structure), as well as new depth values 815b which are not yet represented in intermediate representation 820. In addition, a virtual scan 825a construction of the incomplete model 820 using a predicted pose 825b (which, e.g., could be the highest probability pose in the predicted belief 825c) may be provided to the EM process. In some embodiments, a predicted belief 825c may also be provided to the EM process, for example, to the PSA applied in the M-Step. The PSA 830b may apply a Point-to-Plane metric to determine an updated belief and a most likely pose/transform. The correspondences may be implemented, e.g., using LF with KD-trees, or with IB. The EM process may then identify a final pose 855a relative to the incomplete model 820. The new data points in the data frame may then be used to supplement the incomplete model 820.

Global Localization may also provide a frame 805b from an AR device 810b (though the frame may be subsampled relative to frames 805a and 805c). The Global Localization system may also provide a plurality of starting poses 840a, 840b, 840c and corresponding uncertainty regions 845a, 845b, 845c which may together cover the entirety of the map model. The model 850 may be provided as an LFF representation which may be used in a Point-to-Point metric by the PSA 855 as described in greater detail herein. The PSA may then compute the resulting belief and use the most likely pose as a final pose 855b relative to the model 850.

With regard to Standard Tracking, Standard Tracking may also provide a frame 805c from an AR device 810b (e.g., a same device as was used for all or part of Global Localization) to an EM process comprising an E-step 870a (correspondence determination) and an M-Step 870b (application of the PSA to find an improved belief and pose). The Standard Tracking system may also provide a predicted belief 865b and its most likely pose as the predicted pose 865a to the EM process. The model may be provided as an LFI representation 860 to the EM-process. The EM-process may then identify a final belief and its most likely pose 855c relative to the model 860.

5. Mapping

Figure 9:
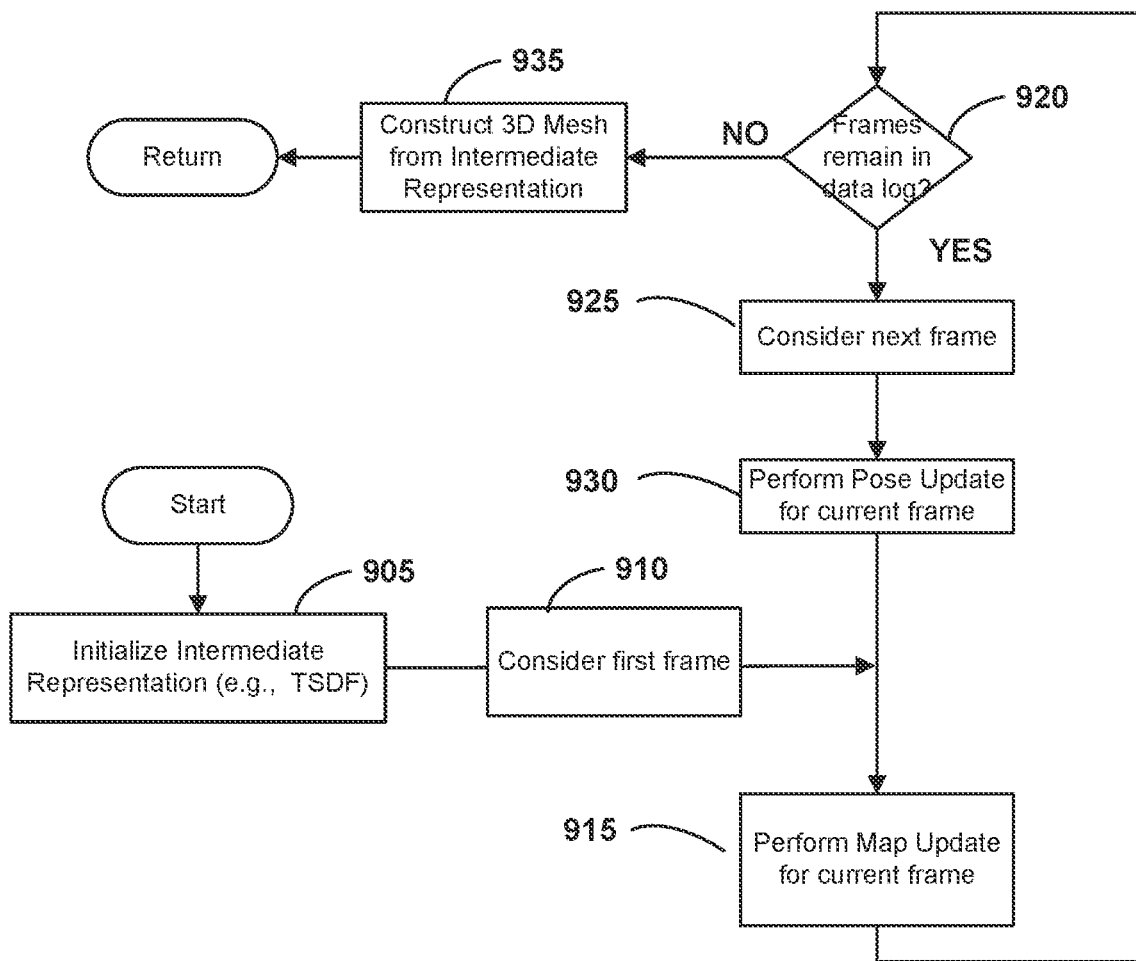
FIG. 9 is a flow diagram generally depicting various steps in a Mapping process to create a model of an environment (e.g., a Truncated Signed Distance Function (TSDF)-based representation) as may be implemented in some embodiments.

The Mapping system produces 3D models (maps) of the environment. The maps may be very accurate to facilitate subsequent operation. FIG. 9 is a flow diagram 900 generally depicting an overview of various steps in a map creation process, e.g., as may occur at block 510 of FIG. 5. In some embodiments, the mapping system uses a Bayesian filter algorithm, e.g., a simultaneous mapping and tracking (SLAM) algorithm, which builds a map based on the camera's pose with respect to the environment. The SLAM method may perform estimation iteratively over the incoming depth frames. Each iteration may consist of a camera Pose Update (e.g., as depicted at block 930) and a Map Update (e.g., as depicted at block 915), though the first frame 910 may be directly applied to the Map Update in the first instance as indicated.

In some embodiments, the mapping system may use an "intermediate" representation when generating the map and may convert this intermediate representation to a final form when finished. For example, in FIG. 9 the first frame 910 may be, e.g., the first frame in a data log or a first frame as it is acquired real-time from a capture device. The intermediate representation may be, e.g., a truncated signed distance function (TSDF) data structure (though one will readily recognize other suitable data structures). However, for purposes of explanation, most of the examples described herein will be with respect to TSDF.

At block 915, the system may perform a Map Update and update the internal representation, e.g., a TSDF representation, with a frame's data. Initially, all the lattice points in the TSDF (also referred to as "cells" or "cell corners" in some instances) may be initialized to a default value at block 905. Applying the Map Update process may adjust some of the TSDF lattice points to reflect a frame's depth data. In some embodiments, to assist with the first frame positioning, the IMU down vector (as measured, e.g., by accelerometers in the captured device) may be aligned with the Z axis. The floor plane may then be extracted. The normal of the floor plane may then be aligned with the Z axis. Rotation around the Z axis as well as 3D translation can be adjusted manually if needed in some embodiments.

While frames remain to be considered at block 920, the system may consider the next frame at block 925. The system may then perform a Pose Update at block 930. For example, during the initial Map Update at block 915 the system may rely upon an arbitrary pose for applying the depth frame data to update the TSDF. During subsequent iterations, however, the incoming depth data should be aligned properly relative to the previous TSDF updates. Accordingly, the Pose Update 930 can improve a camera pose estimate for this frame. The TSDF may then be updated at the Map Update 915.

Once all, or a sufficient number (e.g., to complete a model), of frames have been considered at block 920, at block 935 the system may build a 3D mesh out of the TSDF representation, or construct other representations, such as an LFF and/or LFI as discussed in greater detail herein.

6. Pose Estimation—Pose Tracking

Figure 10:
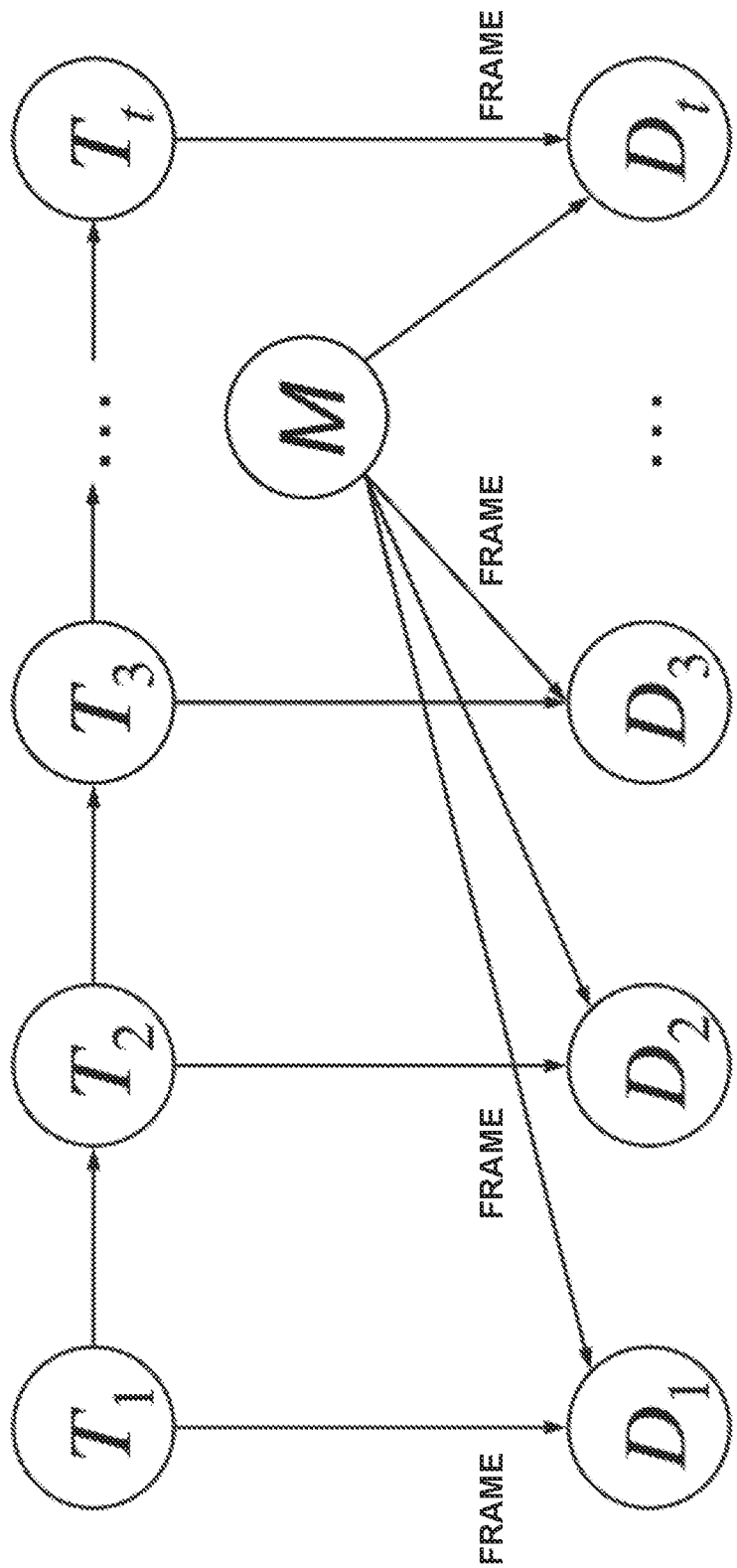
FIG. 10 is a block diagram of a dynamic Bayesian network as may be used in accordance with some embodiments.

In some embodiments, pose tracking can be modeled as a Bayesian process in which the camera pose $T_t$ changes over time due to camera motion. FIG. 10 is a block diagram of a dynamic Bayesian network as may be used in accordance with some embodiments. At each time step t the pose estimation system may obtain a new sensor measurement $D_t$ from the RGBD camera (or any other suitable sensor as discussed herein), e.g., a frame of depth data. Here M represents the environment and $T_1$, $T_2$, etc. the camera poses in the environment at the time when the depth data $D_1$, $D_2$, etc. were taken, $T_1$, $T_2$, etc. are unknown (e.g., unobserved), whereas $D_1$, $D_2$, etc. are known (e.g., observed). During Standard Tracking, M may be considered known (e.g., represented by the previously built model of the environment). During mapping, the map M may be an unknown alongside $T_1$, $T_2$, etc., but unlike the camera pose, the map does not change over time. The system may seek to estimate poses $T_1$, $T_2$, etc., (and possibly estimate M) based on the depth data $D_1$, $D_2$, etc. Due to sensor noise and modeling imprecision, the system may not be able to determine the camera pose with absolute certainty. Instead, the uncertain knowledge of the camera's pose may be described by a probability distribution called the Bayesian "belief" at a given time, $bel_t$.

$$bel_t := p(T_t | D_1, \ldots, D_t) \quad (1)$$

Figure 11:
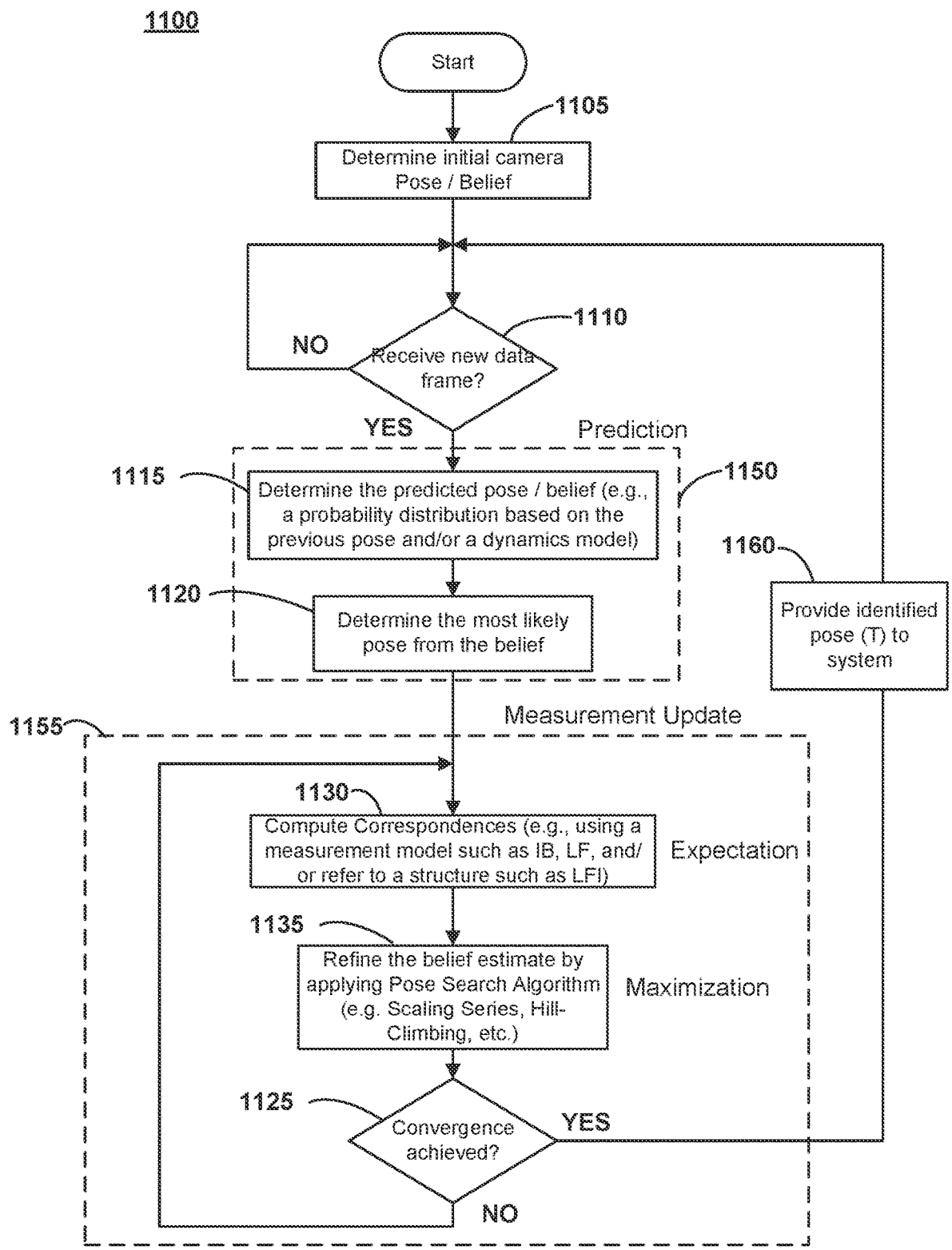
FIG. 11 is a flow diagram generally depicting a summary of an Estimation Maximization algorithm (e.g., for tracking) as may be implemented in some embodiments.
Figure 12:
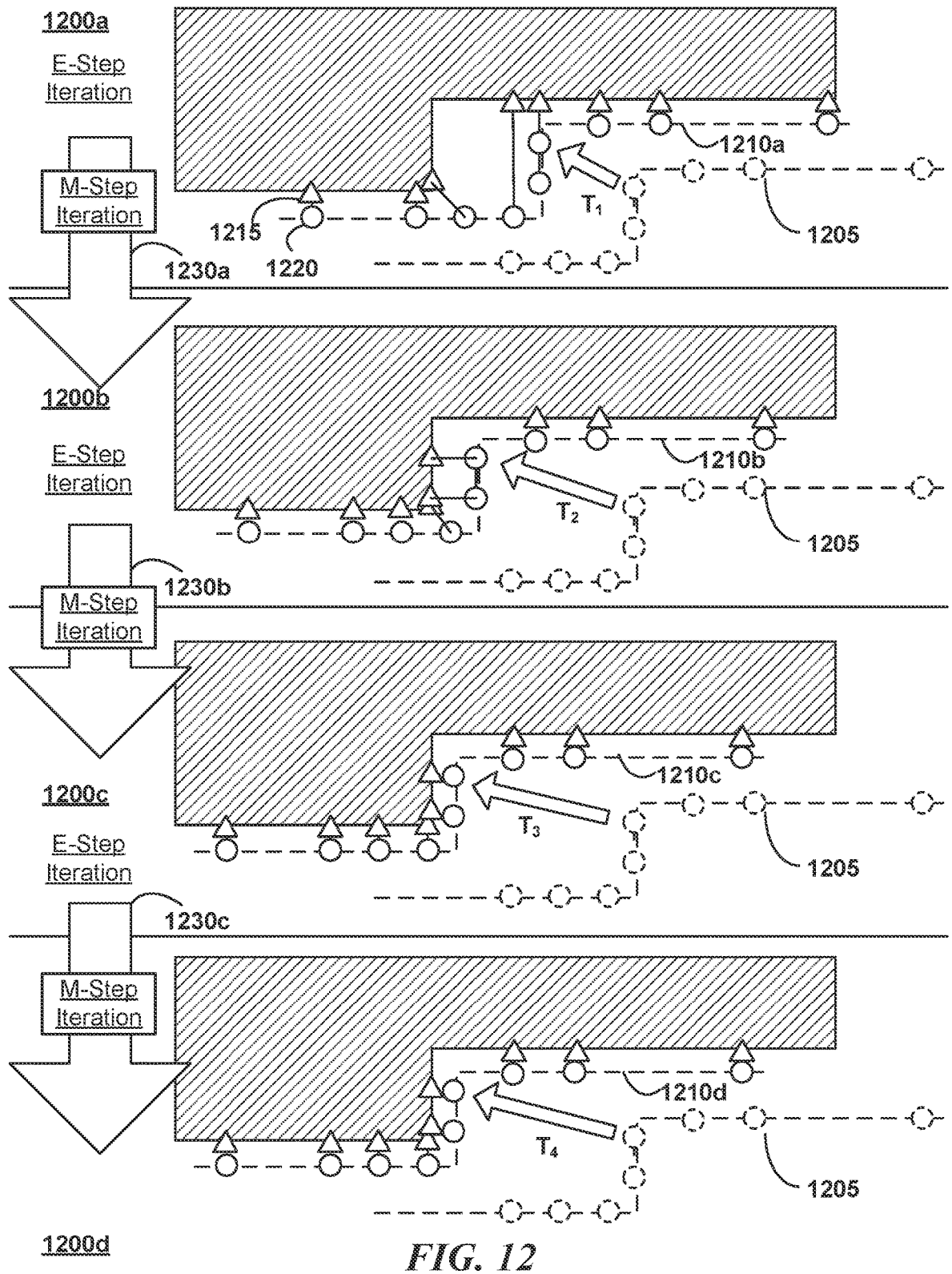
FIG. 12 is a graphical depiction of an example iterative convergence procedure during Estimation Maximization as may be applied in some embodiments.

This probabilistic approach may have the advantage of computing the optimal solution given all the available data, while also properly taking into account sensor noise and modeling uncertainties. The belief may be estimated recursively using the Bayesian recursion formula $$bel_t = \eta p(D_t | T_t) \int p(T_t | T_{t-1}) bel_{t-1} dT_{t-1} \quad (2)$$

where $\eta$ is a normalization constant and $bel_{t-1}$ is the belief at the prior time step t−1. From here on, the term $\eta$ is used to denote the normalization constant. Its value will be different between different equations, but such that the right-hand side of that particular equation integrates to one. The first probability term $p(D_t|T_t)$ is referred to herein as the measurement model, a probabilistic statement that describes how the sensor measurements are taken. The second probability term $p(T_t|T_{t-1})$ is the dynamics model, a probabilistic statement that describes how the camera can move (which may, e.g., consider how fast a human being could move a device, past poses, IMU data, etc.). The Bayesian filter estimates the belief by iterating Prediction and Measurement for each time step t. FIG. 11 a flow diagram generally depicting a summary 1100 of an Estimation Maximization algorithm (e.g., for tracking) as may be implemented in some embodiments. For example, FIG. 11 may reflect the combined operations of the Pose Update process 715c and EM process 740a or the combined operations of the Standard Tracking process 720b and EM process 740b. FIG. 12 is a graphical depiction of an example iterative convergence procedure during Estimation Maximization as may be applied in some embodiments. FIG. 13 is a pseudocode listing reflecting one possible tracking algorithm as may be implemented in some embodiments.

Initially, the system may receive a first camera pose and/or belief at block 1105. This may be an arbitrary, default assumption. In some embodiments, if Standard Tracking is just starting, then it may receive this initial pose and/or belief as the pose and/or belief generated by Global Localization. As new data frames are received at block 1110 the system may update the pose and/or belief estimates.

In Prediction, generally corresponding to blocks of group 1150 in FIG. 11, the system may determine the predicted belief based on, e.g., a frame timestamp, IMU data, (block 1115) and determine the most likely pose (block 1120). Prediction may be part of Pose Update process 715c or Standard Tracking process 720b. For example, the system may use a dynamics model, and compute the integral term from EQN. 2, also referred to as the Bayesian prediction $$\overline{bel}_t = \eta \int p(T_t | T_{t-1}) bel_{t-1} dT_{t-1} \quad (3)$$

This term may reflect the prediction of the camera pose given all the prior measurements, except the very last one. In other words, $$\overline{bel}_t := p(T_t | D_1, D_2, \ldots, D_{t-1}) \quad (4)$$

These steps may generally correspond to the example of lines 3-4 in FIG. 13. MP($\overline{bel}_t$) denotes the maximum-a-posteriori of $bel_t$, e.g., the most likely pose of the camera based on the prediction belief $\overline{bel}_t$.

At the Measurement Update, generally corresponding the blocks of group 1155, if convergence has not yet been achieved (block 1125), the system may determine the correspondences (block 1130) and refine the belief estimate (block 1135) (e.g., determine an improved transform for the pose). These steps may generally correspond to lines 7-12 in FIG. 13. The Measurement Update 1155 may generally correspond to EM process 740a or EM process 740b. The system may compute the resulting belief $bel_t$ for the time step by incorporating the latest measurement $D_t$ using the measurement model $p(D_t|T_t)$. Once convergence has been achieved (e.g., a comparison of the MAR difference between successive transforms is below a threshold, some number of iterations have been performed, etc.) the Measurement Update process may provide the most recent belief and pose 1160 to the requesting system (e.g., the Pose Update process or the Standard Tracking process).

An example of convergence is graphically presented in the block diagram of FIG. 12. The depth values associated with a frame relative to an untranslated, unrotated pose at the origin may result in the depth value positioning at location 1205. A Prediction step 1150 may generate a belief with a most likely transform/pose $T_1$ relocating the depth values to the position 1210a. Correspondences may then be determined in the E-Step 1200a using, e.g., LF with KD-Trees, IB, or LFI models. For example, the depth value 1220 may be determined to correspond with a point 1215 on the surface of an object. The system may provide these correspondences, e.g., to a PSA in the next M-step iteration 1230a.

The M-Step 1230a may produce a new belief with a most likely transform/pose $T_2$ which relocates the depth values to the position 1210b, which may be used by the second EM iteration to generate a second set of correspondences in the E-step 1200b. Similar iterations may continue: M-Step 1230b producing a new belief with a most likely transform/pose $T_3$ which could then be used to identify correspondences for data at the position 1210c; M-Step 1230c producing a new belief with a most likely transform/pose $T_4$ which could then be used to identify correspondences for data at the position 1210d; etc. As indicated, however, as the transform relocates the depth data closer and closer to the "correct" position, the successive transforms may change very little. For example, the difference between $T_4$ and $T_3$ is much less than between $T_4$ and $T_1$. The difference between transforms may be assessed with a metric, e.g., MARs (with an appropriate R selected), and when the difference is beneath a threshold "convergence" may be said to be achieved. The most recent belief and its most likely transform/pose (e.g., $T_4$) may then be returned.

At line 9 of FIG. 13, the LFI data structure may allow for fast correspondence matching and may be used in some embodiments. Without LFI (e.g., during mapping), computing correspondences for the entire model may be very costly. In these cases, some embodiments resort to alignment of the new data to a Virtual Scan of the model, which is generated from the predicted most likely camera pose $T_t^-$ as generated by line 4 of FIG. 13. For the tracker, a "virtual scan" may instead be generated in some embodiments by rendering the model mesh into an OpenGL depth buffer and then reading back the depth values. A PSA optimized to use an LFI data structure, however, may generate better results in some embodiments.

The use of a Virtual Scan may mean that the pose estimation aligns new data only to the Virtual Scan rather than the entire model. For small camera motions (as, e.g., during mapping), this may not be too significant, but for larger motions it may be suboptimal. In contrast to Virtual Scans, LFI has the advantage of aligning the data to the entire model, which may be better for larger motions that can arise during tracking.

The data scan and the virtual scan (if used) may have smooth normal computed. The model may already be smooth enough, but the data may need to be smoothed in order to obtain useful normal in some embodiments. For efficiency reasons, the smooth normal computation may be performed on a GPU. For improved performance, the data scan can also be sub-sampled to reduce the number of point comparisons in some embodiments. During mapping, some embodiments may also remove a border of some width from the data depth scan for the purposes of Pose Update while, e.g., using the entire data scan for Map Update.

With regard to Line 8 of FIG. 13, this loop may gradually refine an estimate of $bel_t$ using expectation maximization (EM) method, specifically a hard-assignment EM version in this example. EM alternates an expectation step (E-Step) and a maximization step (M-Step). The E-Step computes correspondences and the M-Step adjusts the pose.

With regard to Line 9 of FIG. 13, (E-Step), the system may first transform the data scan into world coordinates using the most recent camera pose estimate $\{y_n\}=\{T_t^{(i)}(x_n)\}$. Then, correspondences may be computed using IB, LF, or LFI models (e.g., correspondences as depicted graphically in FIG. 12). Next, the system may compute outliers, which are data points that do not match their corresponding model points very well. A data point may be considered an outlier, e.g., if it does not match up to a valid model point, is too far from the matched model point (more than some threshold $k_{dist}$), does not have a valid normal, or its normal is too different from the model normal. If the percentage of outliers is too great, the system may fail. The tracker can either attempt to restart from the same pose for the next data scan $D_{t+1}$, or it may require re-initialization using Global Localization techniques described in greater detail herein.

In some embodiments, the scan points in a frame of sensor data may come from two types of obstacles: the static obstacles and the dynamic obstacles. Static obstacles are the ones that remained in the same position since the map has been created, e.g., for, walls, etc. Dynamic obstacles are the objects that have moved since map creation. Dynamic obstacles may include people, pets, and any objects moved out of place since the previous mapping. When aligning a data scan to the map, the system, in some embodiments, may filter out dynamic obstacles as they are not on the map. Rejection of outliers is intended for filtering of dynamic obstacles. Thus, the smaller the outlier threshold $k_{dist}$ the more dynamic obstacles will be filtered. This may be desirable for very fine and accurate pose adjustment.

On the other hand, if the outlier threshold $k_{dist}$ is smaller than the error in the current pose estimate, then large portions of static obstacles may be filtered out as well. Without these obstacles, it may be difficult to converge to the correct pose. Since the pose error should gradually get smaller with EM iterations, some embodiments set $k_{dist}$ to a larger value at the start of EM and gradually reduce $k_{dist}$ towards a minimum value.

With regard to Line 10 of FIG. 13, (M-Step), the alignment of selected data points to their corresponding model points may be performed, e.g., using Scaling Series starting with the most recent estimate of the belief $bel_t^{(i)}$ and producing a new estimate $bel_t^{(i+1)}$ (resulting, e.g., in the increasing accurate mappings of states 1200a, 1200b, 1200c, and 1200d in FIG. 12). Distances between points may be computed using a Point-to-Plane metric based on the model normals. Scaling Series updates may be highly parallelized on the GPU. One will recognize that other hill climbing or optimization search techniques may also be used in place of Scaling Series.

The starting uncertainty for Scaling Series may be set to the uncertainty of the prediction distribution $\overline{bel}_t$ produced by the dynamics update. The final uncertainty $\delta^*$ may be set very small in order to achieve a highly accurate alignment. The values for most parameters of Scaling Series may be learned by the system.

With regard to Line 11 of FIG. 13, the improved pose estimate $T_t^{(i+1)}$ may be updated to be the maximum-a-posteriori of $bel_t^{(i+1)}$ and i is incremented for the next iteration.

With regard to Line 12 of FIG. 13, the convergence condition can be, e.g., that either the change in the estimate of $T_t^{(i)}$ becomes very small or the maximum number of EM iterations is reached. Since EM can oscillate between several local minima, some embodiments compute the distance from $T_t^{(i)}$ to all the prior iterations $T_t^{(0)}, \ldots, T_t^{(i-1)}$. If the MAR (e.g., MAR-1) distance from any of the prior iterations is below the convergence threshold, the system may assume that EM has converged and exit the EM loop.

With regard to Line 14 of FIG. 13, once the convergence condition is reached, some embodiments set $bel_t$ and $T_t$ to be the estimates from the last EM iteration i.

7. Pose Estimation—Pose Tracking—Scaling Series

The Scaling Series algorithm (an example PSA) may compute an approximation of the belief bel by weighted particles. A particle represents a position in the search space. For example, where the device's pose is represented as six dimensions (x, y, z, pitch, yaw, roll) then each particle may represent a potential pose across all six dimensions. The initial uncertainty may be assumed to be uniform over the starting region. If the initial uncertainty is assumed to be uniform, the belief may be proportional to the data probability. Thus, the weights can be computed via the measurement model. A more through discussion of an example Scaling Series approach is provided in the PhD Thesis of Anna Petrovskaya, "Towards Dependable Robotic Perception". However, the embodiments described herein are not limited to particularities of that example. Indeed, some embodiments employ other Hill Climbing, or Optimization Search functions in lieu of Scaling Series entirely.

Figure 14:
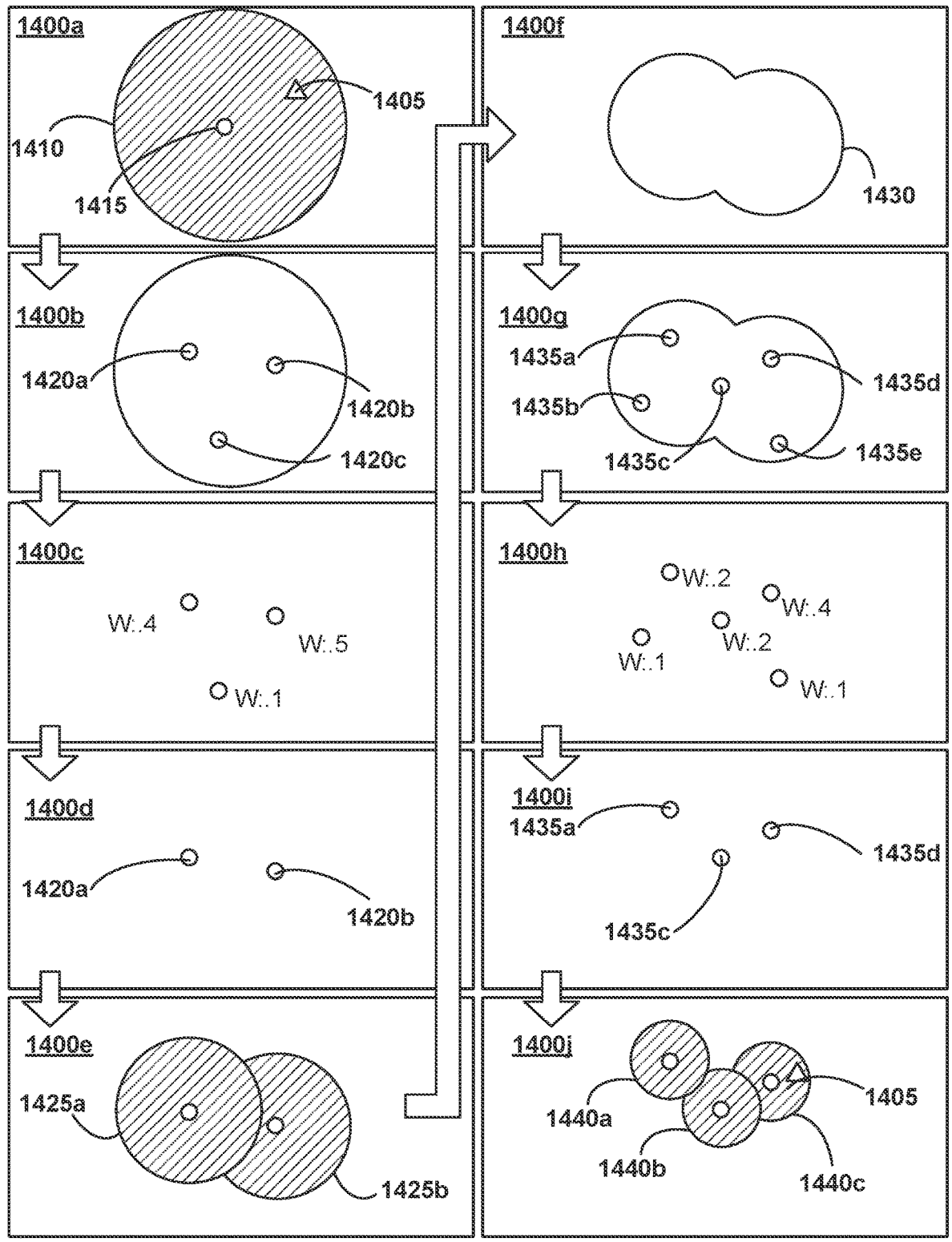
FIG. 14 is a graphical depiction of an example Scaling Series algorithm in a hypothetical two-dimensional universe to facilitate understanding of a higher-dimensional algorithm as may be implemented in some embodiments.
Figure 15:
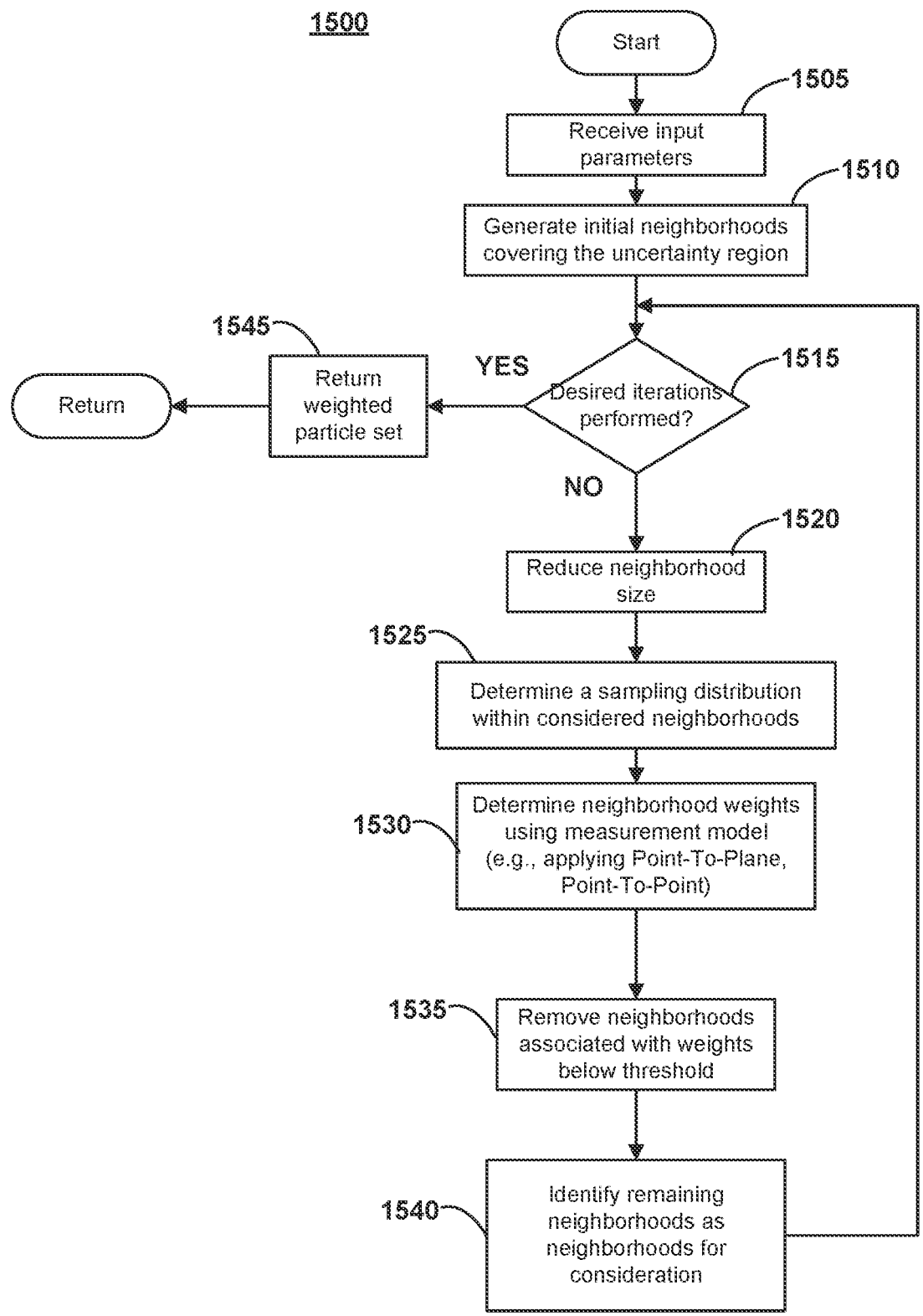
FIG. 15 is a flow diagram describing the operations of an example Scaling Series algorithm implemented in some embodiments.

FIG. 14 is a graphical depiction of a Scaling Series in a hypothetical two-dimensional universe as may be implemented in some embodiments. FIG. 15 is a flow diagram 1500 describing the operations of an example Scaling Series algorithm implemented in some embodiments. FIG. 16 is a pseudocode listing reflecting one possible scaling series algorithm as may be implemented in some embodiments. The search space in this example is depicted in each of steps 1400*a*-1400*j* as a two-dimensional rectangle (a typical search space would comprise, e.g., six rather than two dimensions). In this example, the actual position that best corresponds to the current data is the position 1405.

In this example implementation, at block 1505, the algorithm may take as input the initial uncertainty region, $V_0$, the data set, D (e.g., frame depth data), and two user-specified parameters: M and $\delta^*$. M specifies the number of particles to maintain per $\delta$-neighborhood. $\delta^*$ specifies the terminal value of $\delta$. The refinements may stop once this value is reached. At line 2 of FIG. 16 the scaling factor zoom is set so that the volume of each neighborhood is halved during scaling (though other scaling factors may be used).

At line 3 of FIG. 16, in this example algorithm, the number of iterations N is computed based upon the ratio of initial to final volume (this may be adjusted if, e.g., a different scaling factor is chosen). S denotes a neighborhood, R($\square$) denotes the radius, and Vol($\square$) denotes the volume (e.g., a six-dimensional volume) of the region.

As depicted in lines 1 of FIG. 16 the system may initialize the radius of the neighborhood to be considered to be the radius of the initial uncertainty region. Accordingly, initial neighborhoods covering the uncertainty space are generated at block 1510.

Lines 4-11 of FIG. 16 depict the steps occurring at each iteration of the algorithm. The iterations may be stopped at block 1515 based, e.g., on the number of iterations performed, the size of the neighborhoods, an applied metric, etc. At block 1520 the system may reduce the neighborhood size. For example, as indicated at line 5 of FIG. 16, at each iteration n, $d_n$, is computed by applying the zooming factor to $d_{n-1}$. Where the scaling series applies an annealing approach, at line 6 of FIG. 16, the corresponding temperature $\tau_n$ may also be determined assuming that $\delta^*$ correspond to the temperature of $\tau=1$.

At block 1525, the system may determine a sampling distribution within the neighborhood (e.g., which candidate poses within the space to consider). For example, at line 7 of FIG. 16 the system may draw a particle set $\bar{X}_n$ uniformly from $V_{n-1}$ ensuring that the required density of M particles per $\delta$-neighborhood.

At block 1530, the system may determine measurement weights based on a measurement model. Example measurement weights are described in greater detail herein. For example, at line 8 of FIG. 16, the system may weigh the particles by the annealed data probability at temperature $\tau_n$, which could be, e.g., the probability provided by the measurement model raised to the power of $1/\tau_n$. In the example of FIG. 16, it may also serve to normalize the weights so that they add to 1, depending on the Pruning function on Line 9 (in some embodiments it may not be desirable to normalize weights to have them add up to 1). In some embodiments, the probability provided by the measurement model can be in negative-log form (i.e. not exponentiated to the negative power, e.g. total measurement error squared over 2 as in EQN. 5), also known as energy, thus allowing much better numerical stability in some embodiments when using floating point values. In some implementations, instead of exponentiating energy and raising it to the power of $1/\tau_n$, the energy can be multiplied by $1/\tau_n$ and the probability weights can be kept in negative-log form.

At block 1535, based, e.g., upon the measurement model determinations at block 1530, the system may remove neighborhoods having weights beneath a threshold, e.g., a pruning factor times the highest weight among all particles. If the weights are kept in negative-log form, in some implementations, the pruning can be determined by subtracting the lowest negative-log weight among all particles (e.g., the highest weighted particle would be the lowest energy particle), and determining that it is greater than the negative-log of pruning factor (e.g., $-\log(f)$). For example, at line 9 of FIG. 16 the system may exclude low probability regions (e.g., regions below a threshold).

At block 1540, the system may identify neighborhoods for consideration in a next iteration. For example, at line 10 of FIG. 16 the system may then determine the resulting subregion for this iteration.

FIG. 14 depicts these operations graphically. For example, after several iterations the system may identify a neighborhood in the initial step 1410 about a value 1415. They system may then perform an even density cover (Line 7 of FIG. 16) to identify the points 1420*a*, 1420*b*, 1420*c* ($\bar{X}_1$). Normalized weights may then be computed for each point at step 1400*c* (Line 8 of FIG. 16), Based on these weight values, the points may be pruned so that only 1420*a* and 1420*b* remain (Line 9 of FIG. 16) at step 1400*d*. Smaller neighborhoods 1425*a* and 1425*b* (state 1400*e*) may appear around these points and a union 1430 of these neighborhoods (state 1400*f*) (Line 10 of FIG. 16). A new iteration may then be performed. Particularly, an even density cover (Line 7 of FIG. 16) may be computed across the union 1430 to yield the points 1435*a*, 1435*b*, 1435*c*, 1435*d*, 1435*e* ($\bar{X}_2$). Normalized weights may then be computed for each point at step 1400*h* (Line 8 of FIG. 16). Based on these weight values, the points may be pruned so that only points 1435*a*, 1435*b*, and 1435*c* remain (Line 9 of FIG. 16) at step 1400*i*. Smaller neighborhoods 1440*a*, 1440*b*, and 1440*c* (state 1420*j*) may appear around these points. The union may be taken of the neighborhoods and the iterations may continue.

Once N iterations have been performed (though other stop conditions may be used in some embodiments) the system may return the results at block 1545. For example, the system may prepare the output at lines 12 and 13 of FIG. 16. These lines draw the final particle set and compute weights at temperature $\tau=1$.

8. Pose Estimation—Pose Tracking—Scaling Series—Measurement Models

In some embodiments, the measurement model used to compute the normalized weights at line 8 of FIG. 16 is more complex than the dynamics model used by a Mapping or Tracking System. Generally, it's not possible to model a sensor exactly. On the other hand, this model may have a tremendous impact on accuracy of the estimate and also on the computation time required.

The measurement models applied in some embodiments may have a common structure. Generally, the measurement model may be computed as a Gaussian distribution over the total measurement error $\varepsilon$. For example, $$p(D|T) := \eta \exp\left(-\frac{\varepsilon^2}{2}\right) \tag{5}$$

Where $\eta$ denotes a normalization constant. If a scan is a collection of 3D points $D := \{x_1, \ldots, x_n\}$, the total measurement error $\varepsilon$ is a function of the individual measurement errors $\varepsilon_n$ of each scan point $x_n$. Some embodiments assume that individual scan points are independent of each other given the pose of the camera T, then ε is the $L_2$-norm of the individual errors $$\varepsilon := \sqrt{\sum_n \varepsilon_n^2} \quad (6)$$

In reality, though, the individual scan points may not be completely independent of each other and an L1-norm may give better results:

$$\varepsilon := \sum_n |\varepsilon_n| \quad (7)$$

where |□| denotes the absolute value.

Each individual measurement $x_n$ may be expressed in the camera's local coordinate frame. Taking into account the current camera pose T, these points may be expressed in the world frame $y_n := T(x_n)$. In some embodiments, each individual error is defined to be proportional to some measure of distance from the measurement $y_n$, to some corresponding point $C(y_n)$ on the 3D map:

$$\varepsilon_n := \frac{d(y_n, C(y_n))}{\sigma} \quad (8)$$

Where σ is the standard deviation of the error, which may depend on sensor and map accuracy. The measure of distance d(·, ·) may be the Euclidean distance, though some embodiments instead apply the Point-To-Plane distance, Given the data point $y_n$, its corresponding model point $C(y_n)$ and the surface normal vector at that model point $v_n$, the point-to-plane distance is computed as the absolute value of the dot product $$d(y_n, C(y_n)) := |(C(y_n) - y_n) \cdot v_n| \quad (9)$$

where |·| denotes absolute value and · denotes the dot product operator. Particularly, as described elsewhere herein, both the Pose Update and Standard Tracking processes may determine correspondences $C(y_n)$ which may then be used to determine the distance using the above equations. Additionally, in some implementations, the corresponding point $C(y_n)$ and the normal vector $v_n$ may be provided as a plane (a,b,c,d), in such case the Point-To-Plane distance can be computed as:

$$d((x,y,z),(a,b,c,d)) := |a^*x + b^*y + c^*z + d| \quad (10)$$

where (x,y,z) is the location of $y_n$ and (a,b,c,d) is the corresponding plane representation. In some embodiments, the Global Localization process may instead use an LFF data structure to determine the distance (the LFF may provide the distance value directly without the need to compute the numerator "$d(y_n, C(y_n))$" explicitly). That is, $$\varepsilon_n = \frac{LFF(y_n)}{\sigma} \quad (11)$$

In the presence of outliers, some embodiments cap the value of $\varepsilon_n$ at a maximum value. The correspondence function C(·) may be defined differently in different measurement models as explained herein.

9. Pose Estimation—Pose Tracking—Scaling Series—Measurement Models—Likelihood Grid Model In some circumstances, the LF model may be far too time consuming for tracking (even when using KD trees) but it may be desirable to still use a smoother model (e.g., smoother than an IB model). Thus, in some embodiments, when mapping is complete, the mapping system may pre-compute a grid data structure (e.g., in 3 dimensions), storing the information about the closest mod& point in each grid cell. The Euclidean distance to a closest point on a surface may be stored as a float (the resulting data structure is referred to herein as an LFF). One will recognize other suitable data types. For example, an array of model points and their normals may be stored. An integer index of a closest point in each grid cell may then be stored. This resulting data structure is referred to herein as an LFI (likelihood field integer).

Figure 17:
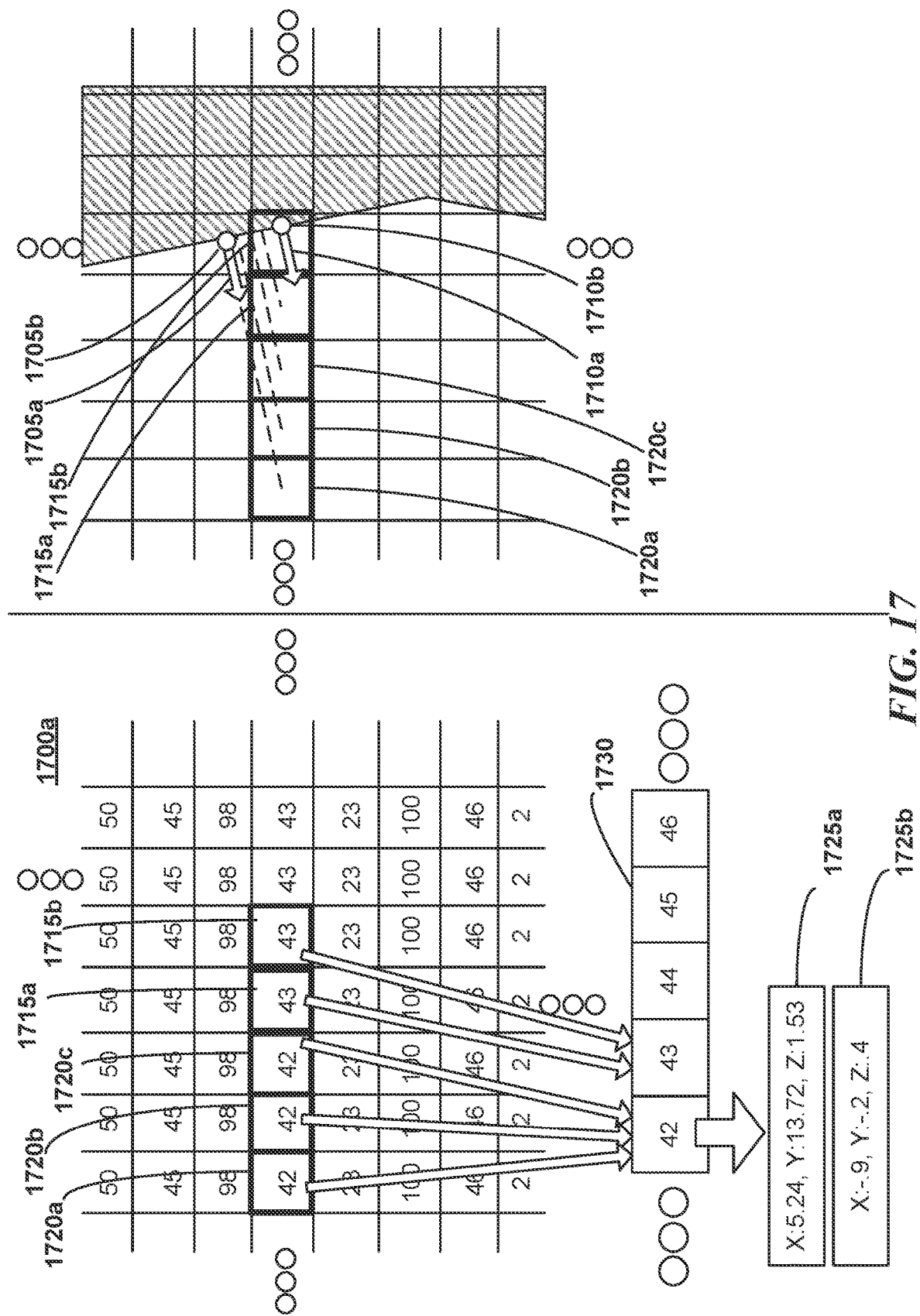
FIG. 17 is an idealized two-dimensional representation of a Likelihood Field Integer (LFI) data structure corresponding to a higher-dimensional structure in some embodiments.

FIG. 17 is an idealized two-dimensional representation of a Likelihood Field Integer (LFI) data structure as may be implemented in some embodiments. In this example, the center of cells 1715a and 1715b may be closest to the point 1710b on a surface having a normal 1710a at the point 1710b. Similarly, the center of cells 1720a, 1720b, and 1720c, may be closest to the point 1705b on a surface having a normal 1705a at the point 1705b. These same cells are highlighted in the view 1700a of the LFI cell structure to facilitate understanding. Cells 1720a, 1720b, and 1720c are assigned the same integer 42 and cells 1715a and 1715b are assigned the same integer 43. These assignments may correspond to entries in an array 1730. For example, the 42nd entry may contain position values 1725a and normal values 1725b corresponding to point 1705b and normal 1705a (more points may exist than those indicated on the surface, e.g., at discrete intervals along the surface). Note that points within the surface may also be associated with indices.

Figure 18:
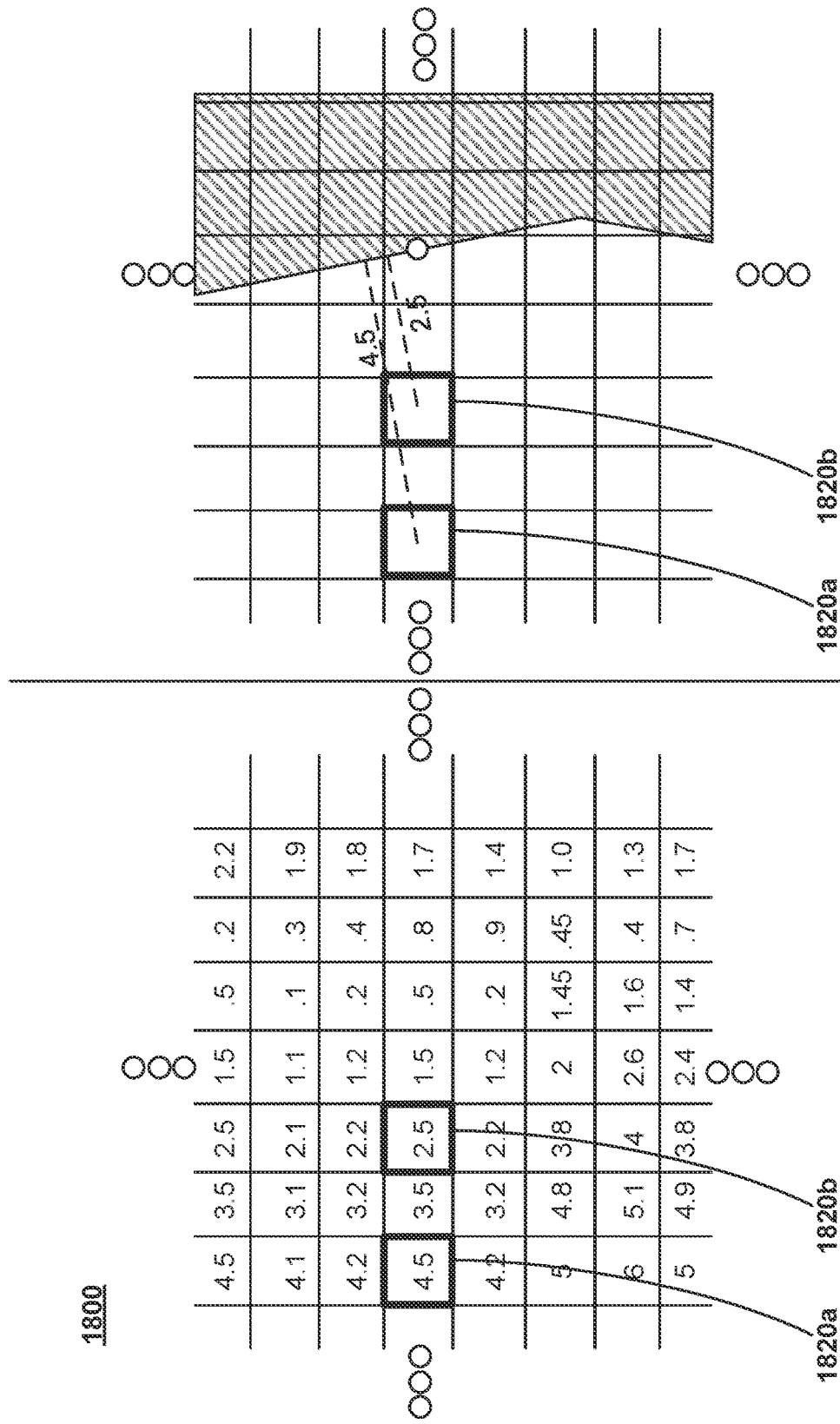
FIG. 18 is an idealized two-dimensional representation of a Likelihood Field Float (LFF) data structure corresponding to a higher-dimensional structure in some embodiments.

FIG. 18 is an idealized two-dimensional representation of a Likelihood Field Float (LFF) data structure as may be implemented in some embodiments. In this example, the center of a cell 1820a may be 4.5 units from a nearest surface and a center of a cell 1820b may be 2.5 units from a nearest surface. Accordingly, the LFF structure 1800 may include these values in the respective cells (highlighted here to facilitate understanding). Note that points within the surface may also be associated with distances to the surface (note that the distance values provided here are merely to facilitate understanding and may not be exact).

LFFs may be smaller and faster to look up than LFIs. LFIs may be slower due to double references, but may allow for point-to-plane distance computations. LFIs may also provide for more accurate matches at close distances since actual model points are used. Consequently, some embodiments use LFIs for pose tracking during regular operation of the AR device, and use LFFs for global localization.

10. Head Mounted Embodiments Overview

Various of the disclosed embodiments provide AR functionality for opaque, "non-see-through" HMDs (generally referred to as a VR HMD herein, though some VR displays may not be entirely opaque and some AR displays may not be entirely transparent), which may include, e.g., an RGB or RGBD camera. In such systems, the captured frame may be rendered as a three-dimensional object upon the HMD screen. Were one simply to redirect captured frames from a camera on the HMD into the user's screen, the experience will often be disorienting and nauseating. Such discomfort would often result from camera-to-display latency. This latency may result in the displayed real-world image lagging the actual position of the user's head, sometimes by a considerable amount. Even when such delay is not directly perceived, nausea can still result from the user's subconscious recognition of the disparity.

11. Example HMD System

Figure 19:
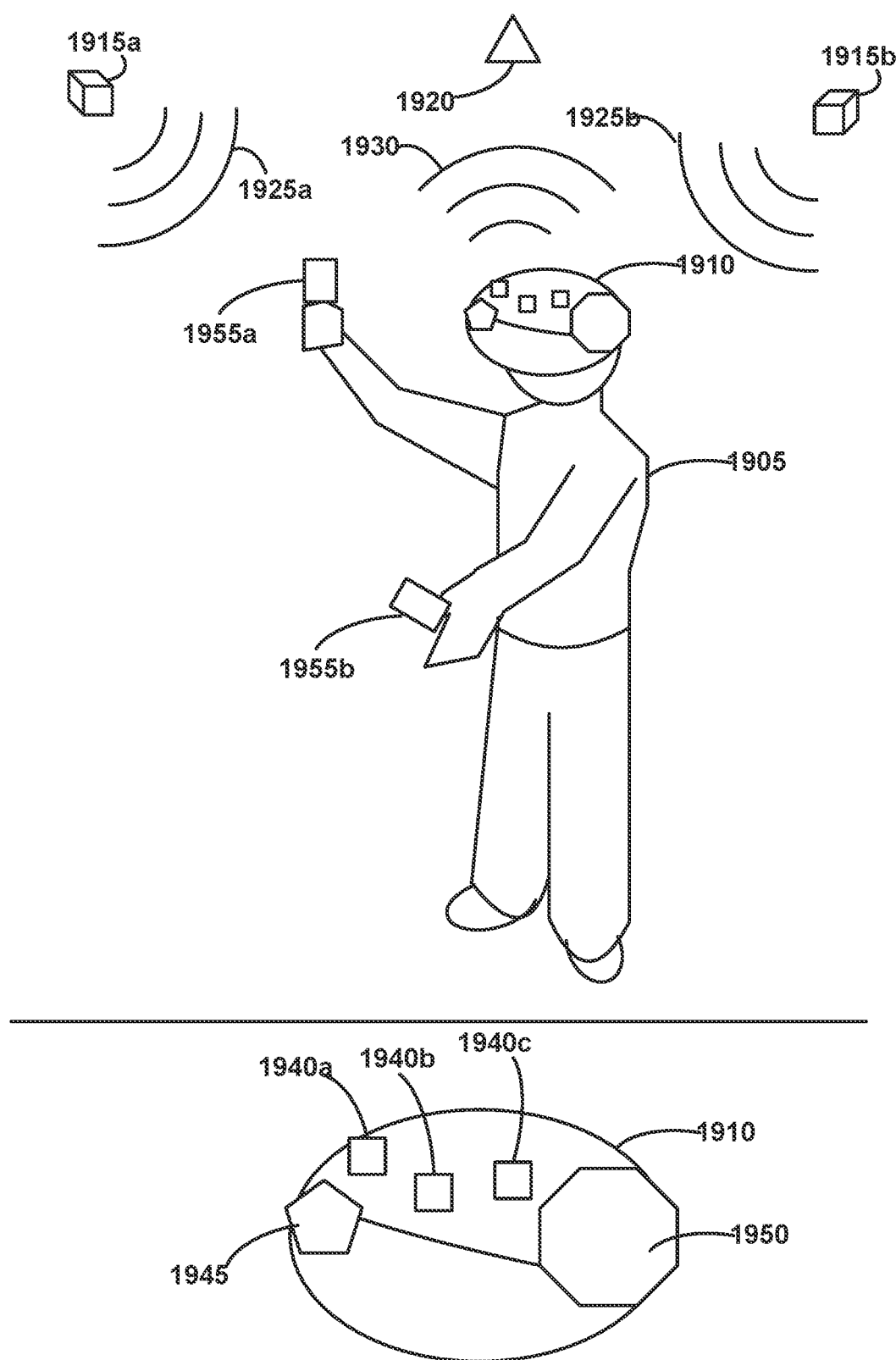
FIG. 19 is an example HMD configuration which may be used in some embodiments.

FIG. 19 is an example HMD configuration that may be used in some embodiments. A user 1905 may wear an HMD 1910 with a screen providing a computer-generated field of view to the user 1905. The HMD 1910 may include a capture device 1945 configured to acquire depth and/or visual image data (e.g., RGB data). The image presented here is abstracted to facilitate understanding, and one would recognize that many capture devices, e.g., RGBD cameras, may be integrated into the HMD form factor. The capture device 1945 may be situated so as to capture data in the field of view of the user 1905 occluded by the HMD 1910. Some embodiments of the HMD 1910 may include earphones 1950 and other peripheral features, e.g., a microphone.

In some embodiments, pose estimation of the HMD 1910 (and consequently the user's head) may be performed locally using, e.g., an inertial measurement unit (IMU). Some embodiments may relay depth data information from capture device 1945 to a processing system which may infer the pose relative to a previously acquired depth map of the environment (e.g., using the methods described in U.S. Provisional Patent Application No. 62/080,400 and U.S. Provisional Patent Application No. 62/080,983). In some embodiments, the HMD 1910 may include a plurality of reflectors or collectors 1940a, 1940b, 1940c which may be used in conjunction with a plurality of emitters 1915a, 1915b. Emitters 1915a, 1915b may generate electromagnetic signals 1925a, 1925b (e.g., via antennas or lasers) which may be then reflected from the reflectors or absorbed by collectors 1940a, 1940b, 1940c (e.g., the Valve™ Lighthouse™ positioning system need not use reflectors). Where reflectors are used, the reflected signals 1930 may then be collected at a collector 1920 and interpreted to ascertain the current pose of the HMD 1910. This pose may be relayed to the currently running application (e.g., to determine the relative orientation of the HMD 1910 to a virtual object in the AR or VR experience). In some embodiments, use of the mapping techniques described in U.S. Provisional Patent Application No. 62/080,400 and U.S. Provisional Patent Application No. 62/080,983 may obviate the need for such a reflector-based pose determination system.

In some embodiments, the user may hold one or more interface controllers 1955a, 1955b. The controllers 1955a, 1955b may be in communication with the HMD application (e.g., via Bluetooth connection), or with a separate computer system, relaying their orientation and/or position. The controllers 1955a, 1955b may include buttons, switches, analog sticks, etc. In some embodiments, the user may employ hand gestures in lieu of a handheld controller.

12. Anticipatory Rendering Operations

FIG. 20 includes perspective 2000a and top-down 2000b views of a user 2060 wearing an HMD in a real-world environment as may occur in various embodiments. The HMD may occlude the user's 2060 entire field of view, e.g., in the case where a VR HMD has been repurposed for use in an AR application. Accordingly, the user 2060 may experience some discomfiture from latency between the image presented to their eyes and the motion of their head. To mitigate such discomfiture, the system may employ various of the predictive operations disclosed herein, which may transforming the captured visual images and/or virtual objects accordingly. By anticipating where the user's head will be at the time of rendering, the captured frame data (e.g., RGB data or depth data) can be transformed to minimize user nausea. Additionally, when the user looks around various objects 2005, 2010, 2015 in the room the transformed image may include regions absent from the original frame capture. Particularly, the user may observe some artifacts when the user moves to see something that was previously occluded. Accordingly, some embodiments allow the user to see a stretched mesh (which for short millisecond delays may not introduce a noticeable difference in the user experience), or to fill in the lacuna from a previously acquired depth and/or texture map of the room. When the occluded region is supplemented with the map, the system may try to match the texture of the virtual map with the real-world lighting by adjusting the pixel values and/or blurring the pixel values. In this manner, the anticipated rendering may present the user 2060 with the proper image for the render time, even if all the data appearing in that rendering was not acquired in conjunction with the most recent data capture.

13. Example System Timing

Figure 21:
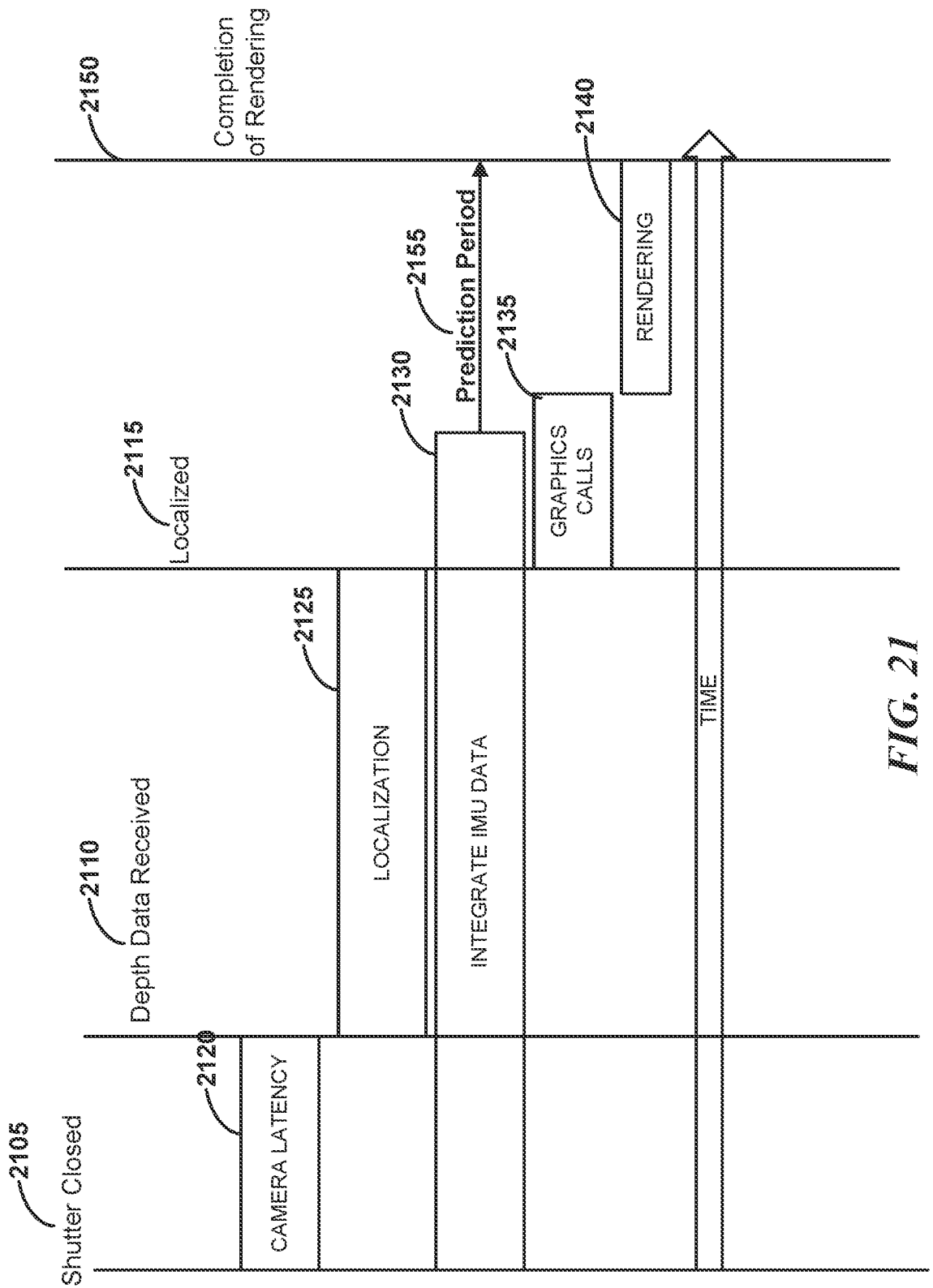
FIG. 21 is a timing diagram of various operations in a rendering prediction process as may be performed in some embodiments.

Some embodiments retrieve a frame of visual data (e.g., RGB) and depth data, then predict the orientation of the user's head when that frame is displayed. The system may then render the frame data from the predicted perspective, rather than as originally acquired. FIG. 21 is a timing diagram of various operations in a rendering prediction process as may be performed in some embodiments. A capture device may complete the capture of the visual image and/or depth data in front of the HMD at 2105. Though the images have been captured, a latency delay 2120 of several milliseconds (e.g., 10-100 ms) may occur before the data can be received at the processing system (e.g., during transfer across a bus). Once the depth data is received 2110, localization 2125 may begin, e.g., based upon the depth data. In some embodiments, however, localization may be occurring asynchronously with depth data capture, e.g., when reflectors or collectors 1940a, 1940b, 1940c are used.

IMU data integration 2130 may occur throughout the visual image capture and presentation. For example, the user may be rotating their head during the capture process and the IMU may be much faster than the depth camera, providing many updates between depth data captures. These IMU data points may be used in conjunction with localization 2115 to determine a predicted pose of the user's head at the completion of rendering 2150. Accordingly, the system will try to predict the change in head orientation during the prediction period 2155 relative to the last sensed pose (e.g., by taking the computed localization pose at time 2105 and applying IMU data to that pose to find the best estimate of the last sensed pose at the time of the last received IMU data) and applying prediction to where the HMD (and user's head) will be at the time and/or completion of the rendering cycle (e.g., by applying positional and rotational velocities by the time duration of prediction period 2155 to determine the estimated pose, and/or applying a predictive filter, such as a Kalman filter). Rendering may itself be further delayed by the calling of the graphic functionality 2135 and the rendering process itself 2140.

Thus, when the system decides to render the frame captured at time 2105, as well as any virtual objects (including, e.g., their occlusions by real world objects), the system may use a predicted pose of the user's head based upon the localized position and IMU data.

14. Example Predictive Rendering Process

Figure 22:
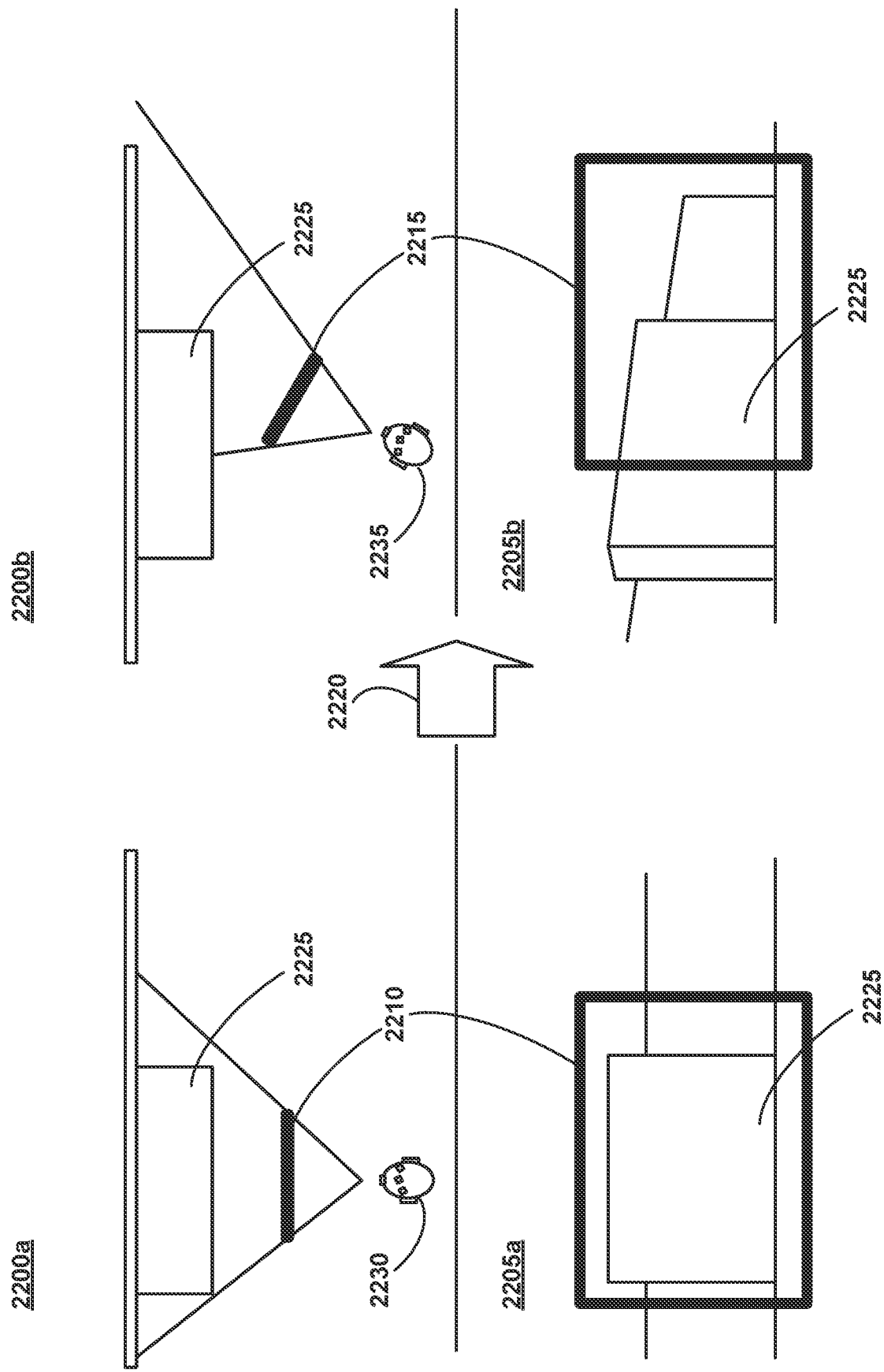
FIG. 22 is a perspective view comparing a user's real world change in pose with the projection upon a virtual camera within the HMD as may occur in some embodiments.

FIG. 22 is a perspective view comparing a user's real world change in pose with the projection upon the virtual camera within the HMD as may occur in some embodiments. A user in a first pose 2230, may perceive an object 2225 "head-on" in the real world configuration 2200a. When depth camera captures this perspective it may result in a frame presenting the in-HMD view as shown in the virtual camera field of view 2210 in image 2205a. That is, the depth values will be projected onto the plane of the virtual camera 2210 as shown.

When the user rotates 2220 their head to the new pose 2235, the real-world configuration 2200b may result. In the corresponding HMD image 2205b, the depth values upon the virtual camera 2215 assume a new projection. Here, object 2225 will appear at an angle relative to the user. If the user has turned their head and expected to see image 2205b but instead sees image 2205a, nausea and confusion may result. Consequently, various embodiments seek to transform and/or supplement the depth data of image 2205a to more closely resemble the image 2205b expected by the user at the time of rendering. Note that the new pose 2235 presents portions of objects in the user's field of view which were absent in the original virtual camera field of view 2210.

Figure 23:
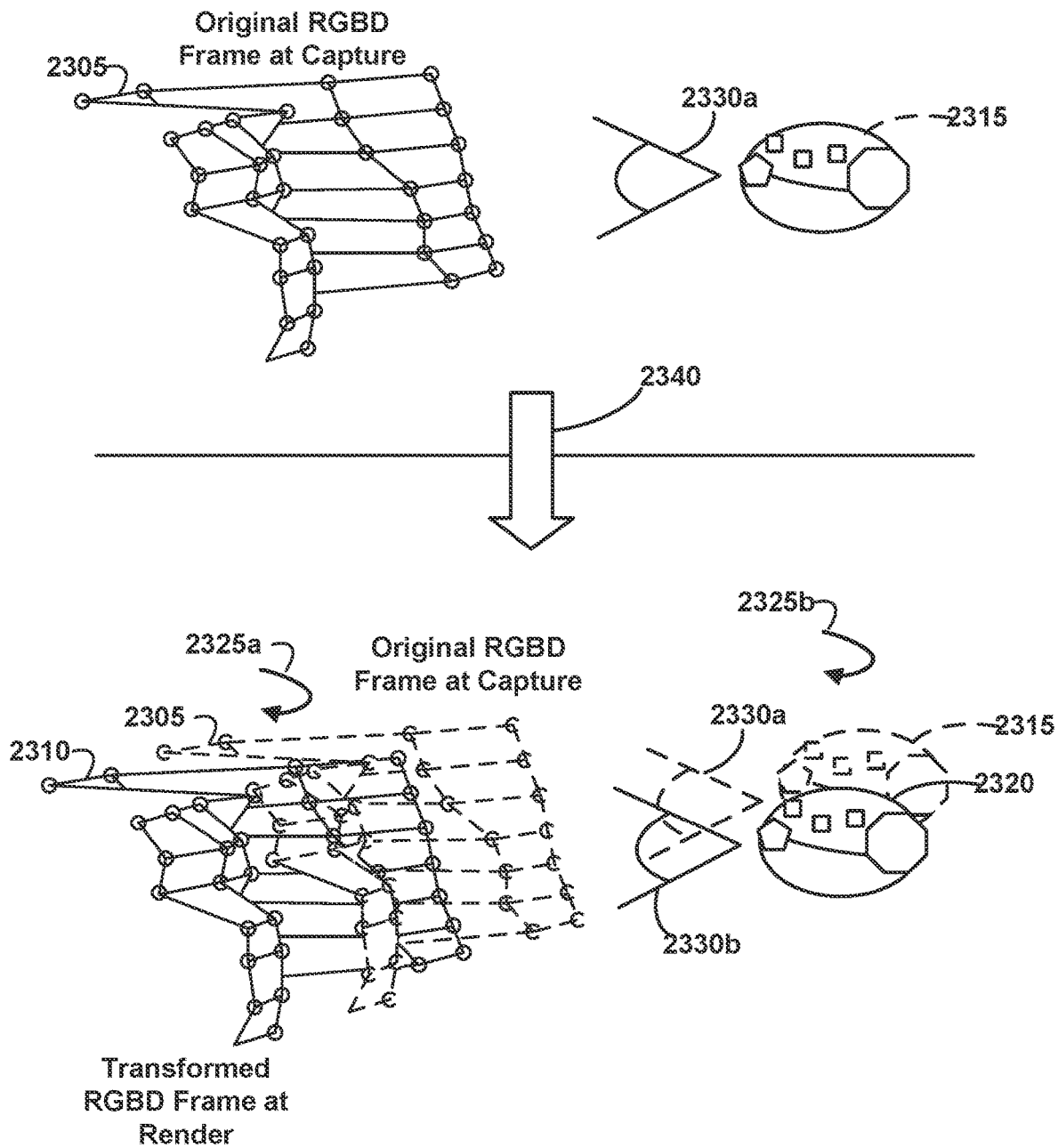
FIG. 23 is a perspective view illustrating the generation of a transformed predicted RGBD frame as may occur in some embodiments.

In some embodiments, the system may modify or supplement the captured data to anticipate and mitigate the user's perception of this latency-induced disparity. For example, FIG. 23 is a block diagram illustrating the generation of a transformed RGBD frame as may occur in some embodiments. A camera, including a depth sensor, located on the HMD may capture an initial "frame" 2305 when the HMD is oriented in a first pose 2315 with a first field of view 2330a. Here, the initial "frame" 2305 is represented as a vertex mesh, though one will recognize a variety of potential representations of the depth and/or RGB or grayscale data. As discussed herein, there may be a delay 2340 between this initial frame capture and the subsequent rendering of the frame in the HMD. In this interval, the user's head may have undergone a transform 2325b (e.g., a rotation and/or translation) to a new pose 2320 resulting in a new field of view 2330b. Consequently, the system may perform a corresponding transform 2325a to the initial frame 2305 to produce the transformed frame 2310. The system may then render this transformed frame 2310 to the user. In some embodiments, the transformed frame 2310 may be rendered as a mesh in the user's HMD, e.g., as an object in an OpenGL™ rendering pipeline presented in the HMD. Though FIG. 23 illustrates both a transformed HMD position and a transformed frame to facilitate understanding, the depicted motion of the HMD refers to the real-world movement of the user's head, while the transformation of the frame refers to a transformation as seen relative to the virtual camera of the HMD's rendering pipeline (e.g., in the OpenGL™ rendering pipeline).

Figure 24:
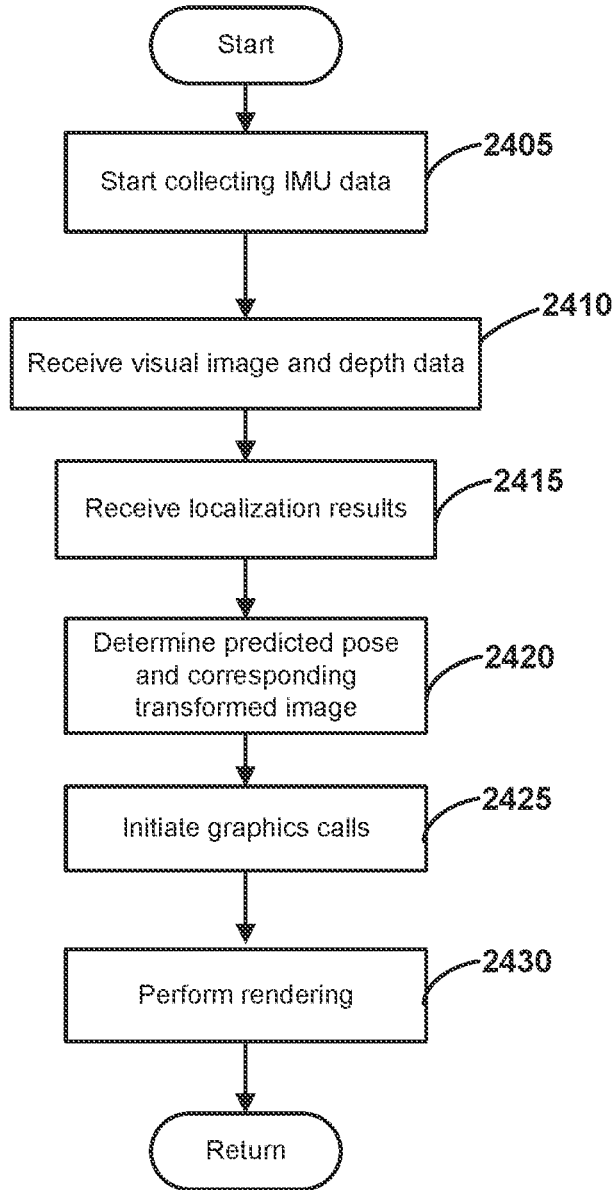
FIG. 24 is a flow diagram illustrating aspects of an example rendering prediction process as may occur in various embodiments.

FIG. 24 is a flow diagram illustrating aspects of an example rendering prediction process 2400 as may occur in various embodiments. At block 2405, the system may begin collecting NU data. At block 2410, the system may receive the visual and depth data from the HMD. At block 2415, the system may receive the localization results for the HMD. Based upon the integration data and the localization results the system may predict the user's head position at the time of rendering at block 2420. For example, the system may apply the collected IMU data to the localization result, estimate when the rendering will be performed, and apply forward prediction to that time (e.g., by using current velocities). Graphics calls to initiate this rendering may then be performed at block 2425 and the image rendered at block 2430. In some system architectures, it may be possible to begin making graphics calls before the pose prediction has been determined.

Figure 25:
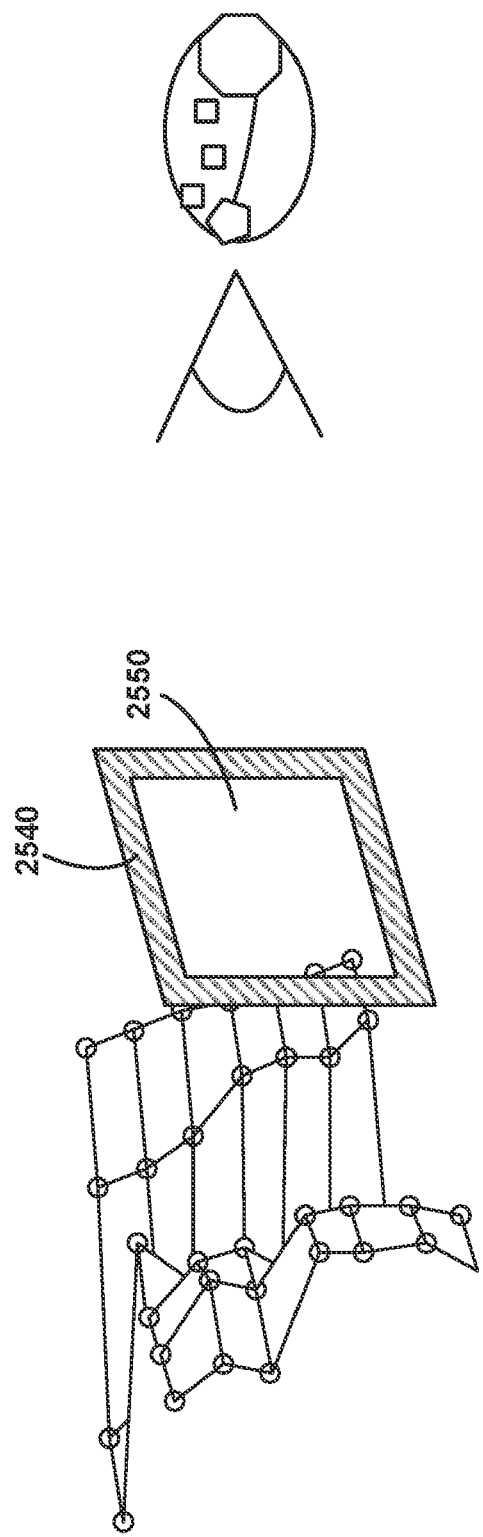
FIG. 25 is a perspective view illustrating a border constraint as may be applied in some embodiments.

While new data may be presented in user's field of view in the transformed frame 2310 as described herein, and supplemented using, e.g., pixel blurring, virtual model substitution, etc., some embodiments may impose a border constraint to accommodate generation of the transformed frame. For example, FIG. 25 is a perspective view illustrating a border constraint as may be applied in some embodiments. Particularly, some depth cameras may allow frames to be captured with wider fields of view than the field of view that will be presented by the system to the user. For example, the entirety of the depth data captured from a given perspective may include both a border region 2540 and an inner region 2550. The inner region 2550 may reflect the portion presented to a user within the HMD, while the border region 2540 reflects an additional region outside the field of view. The camera may be designed or selected such that the border region 2540 is sufficiently large so that the user's head motion will not, or is unlikely to, present "new" data outside the border region. In this manner, the system may rely upon the border data, e.g., at block 2420, rather than the virtual model of the environment, blurring etc. if possible.

15. Anticipatory Rendering Operations

Figure 26:
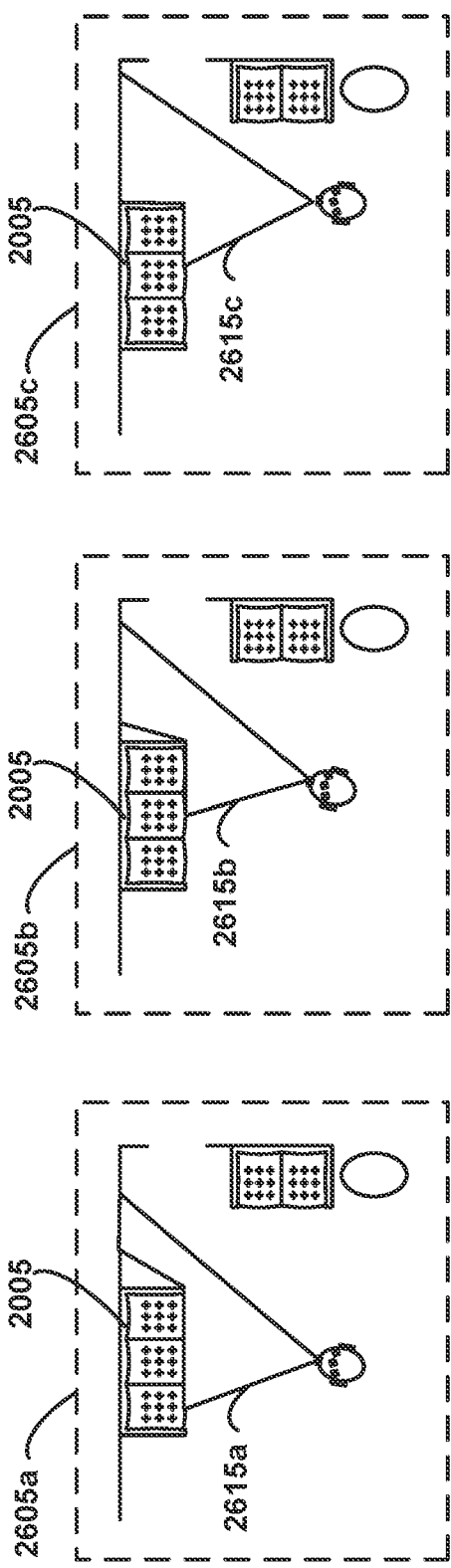
FIG. 26 is a plurality of field-of-view transformations performed by the user relative to objects in a real-world environment as may occur in various embodiments.

FIG. 26 is a plurality of field-of-view transformations performed by the user relative to objects in a real-world environment as may occur in various embodiments. Situations 2605a, 2605b, 2605c demonstrate example fields of view relative to the environment depicted in FIG. 20. Particularly, from the original orientation of situation 2605a the user may have a field of view 2615a encompassing mostly the couch 2005. From this position, the user may move to the right, producing situation 2605b and situation 2605c upon further movement, with corresponding fields of view 2615b, 2615c.

In these new fields of view 2615b, 2615c, the user may see more of the wall next to the couch (in the middle of his field of view as opposed to on the edge of it) which is not visible from frame captures when the user was in the original orientation 2605a. If the system were to render the earlier frame data as a transformed mesh, the consecutive pixels/vertices on the edge of the couch and wall would be stretched. This may result in a gap of multiple pixels between the couch and the wall once the frame is rendered to the user. Some embodiments may determine the magnitude of the distance between consecutive pixels/vertices (e.g., consecutive both left-right (horizontally) as well as up-down (vertically)) which have been stretched. The system may determine this stretching by, e.g., taking consecutive pixels/vertices, projecting them into the predicted field of view, and seeing how far away they are from each other. Pixels/vertices (and possibly additional pixels) may be skipped when they are flipped. For example, if the pixel/vertex a was to the left of the next pixel/vertex b, but in the projected predicted view it is to the right of pixel/vertex b, then some embodiments may continue to skip pixels/vertices until they find the next pixel/vertex to the right of pixel/vertex a that is projected in the predicted view to the right of pixel/vertex a (skipping all pixels/vertices that project to the left of pixel/vertex a). The system may perform a similar procedure for consecutive up-down pixels, etc.

To clarify, FIG. 27 is an example orientation transformation illustrating the pixel/vertex skipping that may be applied by the system in some embodiments following pixel/vertex stretching. Initially 2700a, at the time of depth data capture, the user's HMD may be in a first orientation 2705a. In this orientation 2705a, the user may perceive a wall 2710 such that the distance to portions A 2715a and B 2715b of the wall 2710 are assessed by consecutive depth rays wall 2720a and 2720b respectively. Consequently, a two-dimensional projection of the user's field of view in this orientation 2705a would present a pixel or vertex position for the point A 2735a as being immediately adjacent and to the left of the pixel or vertex position for the point B 2735b.

However, between this time of depth capture 2700a and the time of rendering within the HMD 2700b, the user's head may have experienced a transform 2730. In the resulting orientation 2705b, not only would the points A 2715a and B 2715b of the wall 2710 no longer be associated with consecutive depth rays (if a depth capture were taken), but they would be reversed in their horizontal relation. Particularly, the consecutive depth values 2725a-2725e would result in corresponding consecutive projected pixel or vertex positions 2740a-2740e. By anticipating that the user will be in orientation 2705b at the time of rendering, the system may consult a previously acquired depth model of the environment to recognize the new relation between positions A and B reflected in 2740a-2740e. Consequently, the system may skip the pixels or vertices associated with positions 2740a-2740d, recognizing that the data captured at orientation 2705a lacks information about this region. Instead, the system may substitute this portion of the rendered frame with stretched pixels, a portion of the virtual model, or blurred pixels, etc. as described herein.

Additionally, some implementations may determine and compensate for pixels/vertices closer or farther when they flip in the rendered frame as compared to the original depth capture frame. The system may skip the farther (occluded) pixels/vertices while properly processing stretching of visible (non-occluded) pixels. In some embodiments, when the stretch distance is within a specific threshold distance (e.g., greater than min_blur_stretch but less than max_blur_stretch), the resulting intermediate pixels between the projected pair of pixels in the predicted view may be marked for blurring. In some embodiments, the blurring factor used for each pixel may be different and may depend upon how far away the pixel is from either of the projected pair of pixels.

In some implementations, when the stretch distance is above a certain threshold distance, the system may mark the resulting intermediate pixels between the projected pair of pixels in the predicted view for reconstruction from the previously generated map/model. For example, after the mesh is rendered, those pixels within the stretched areas may instead be recolored by raytracing on the map/model. Alternatively, the system may separate the mesh between those pixels such that triangles (or other mesh polygon faces) between those pixels are not rendered. In these instances, the map/model may be rendered as well and be visible to the user through those gaps, etc.

Inserting the map data directly may result in a somewhat artificial appearance. Accordingly, the texture of the map may be augmented based upon the lighting assessed form the previously captured frame and the currently observed lighting from surrounding pixels. In some embodiments, once the rendering of frame data, and optionally the map data is complete, the system may iterate through all the pixels marked for blurring and blur them with respect to the surrounding pixels. The system may optionally apply a blurring factor or other parameters as determined for each pixel. One will readily recognize that rotations, rather than translation, as well as combination of both rotations and translations, may also introduce such new information. Similarly, the change in field of view may occur in a three-dimensional volume.

Figure 28:
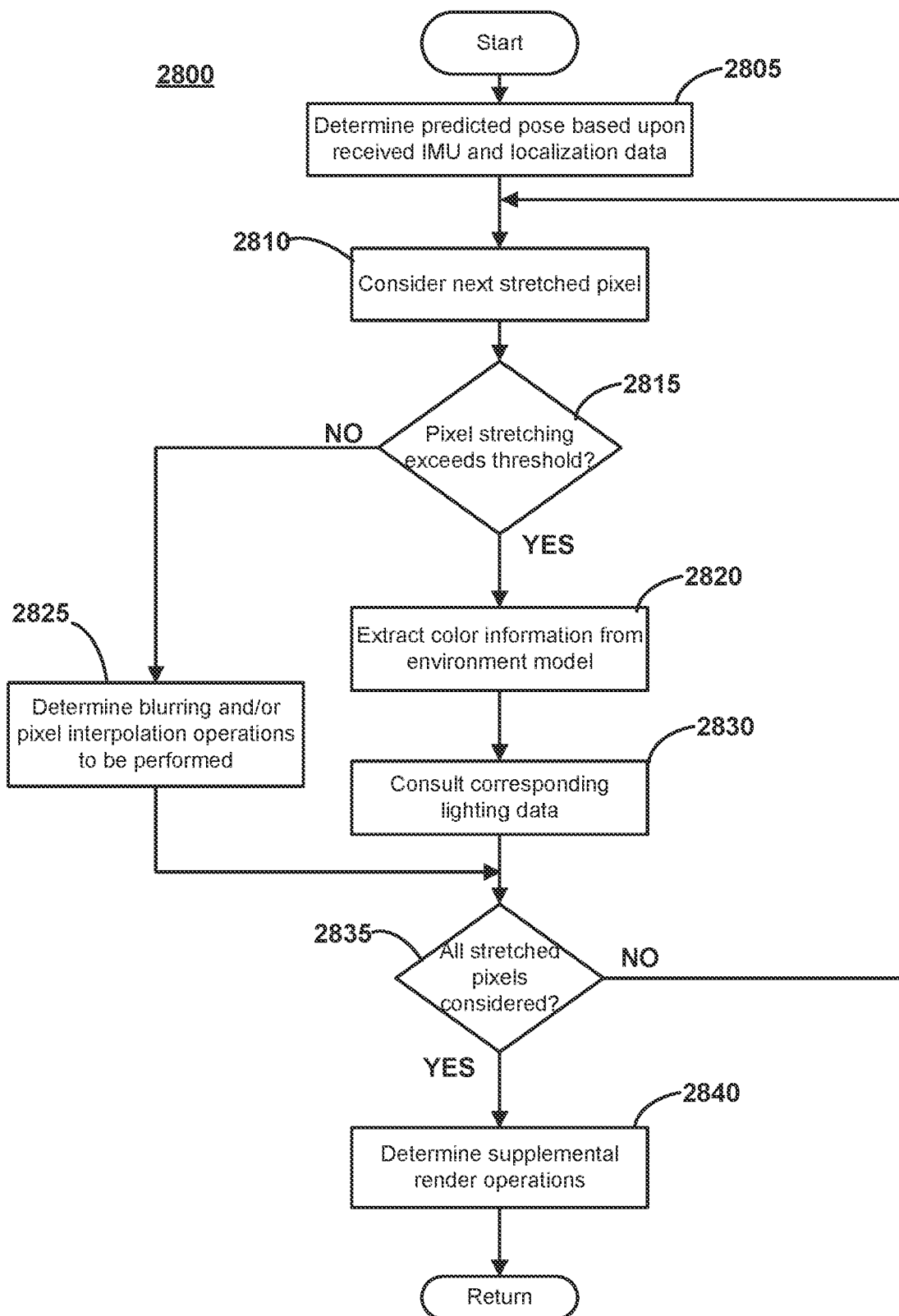
FIG. 28 is a flow diagram depicting various example anticipatory rendering operations as may be performed in some embodiments.

FIG. 28 is a flow diagram depicting various example anticipatory rendering operations as may be performed in some embodiments. The process 2800 may be performed at block 2420 in some embodiments. At block 2805, the system may consider the IMU and localization results received until this time and determine the predicted pose at the time of rendering. At block 2810, the system may consider the next stretched pixel, the stretch pixels determined based upon the predicted pose. At block 2815, the system may determine if the pixel stretching is below a threshold. If so, then at block 2825, the system may determine blurring and/or pixel interpolation operations to be performed for the pixel.

Conversely, where the stretching is sufficiently great or different (e.g., as in situation 2605c), then the system may consult the previously constructed texture and map for the environment at block 2820. When the system extracts color information from the previously generated map/model, the discrepancy between the map texture and the real world lighting values may result in an artificial appearance. Accordingly, at block 2830, the system may compare the lighting data (e.g., pixel intensity, or value in HSV color space) in the surrounding pixels in the captured frame with the lighting values of the corresponding portions of the environment in the previously generated map/model. The system may then adjust the newly added pixels from the previously generated map/model to try to more closely match the currently observed lighting. The user may consequently fail to distinguish the newly captured frame data from the reconstructed model data. Alternatively, some embodiments may compare the pixels with values from previously acquired frame(s) or otherwise determine the difference in lighting conditions at the present moment and when the mesh was previously generated. The system may then adjust the rendered frame's pixels to achieve more natural lighting in the new region.

Once all the stretched pixels are considered at block 2835, the system may determine how to incorporate the data from blocks 2825 or 2820 and 2830 into the frame to be rendered (e.g., indicating which pixels will be blurred, the degree of blurring, which pixels will be substituted with model data, etc.) at block 2840. In some implementations, after the loop completes at block 2835, all pixels in the frame to be rendered, which are marked for blurring, may be blurred.

16. Nearest Visible Projected Pixel Distance

In some embodiments, instead of determining pixel stretch distances for each pixel in the predicted view, the system may calculate the distance from that pixel to the nearest visible projected pixel/vertex (that is, a pixel/vertex from frame data that is transformed and projected into the predicted view, but only those pixels/vertices that are visible and not occluded by some other mesh triangles or other pixels/vertices). In such embodiments, instead of using pixel stretch distances to determine whether to blur or reconstruct from previously generated map/model, the system may use each pixel's Nearest Visible Projected Pixel (NVPP) distance to determine if this pixel should be extracted/reconstructed from the previously generated map/model, or if it should be blurred.

17. Computer System

Figure 29:
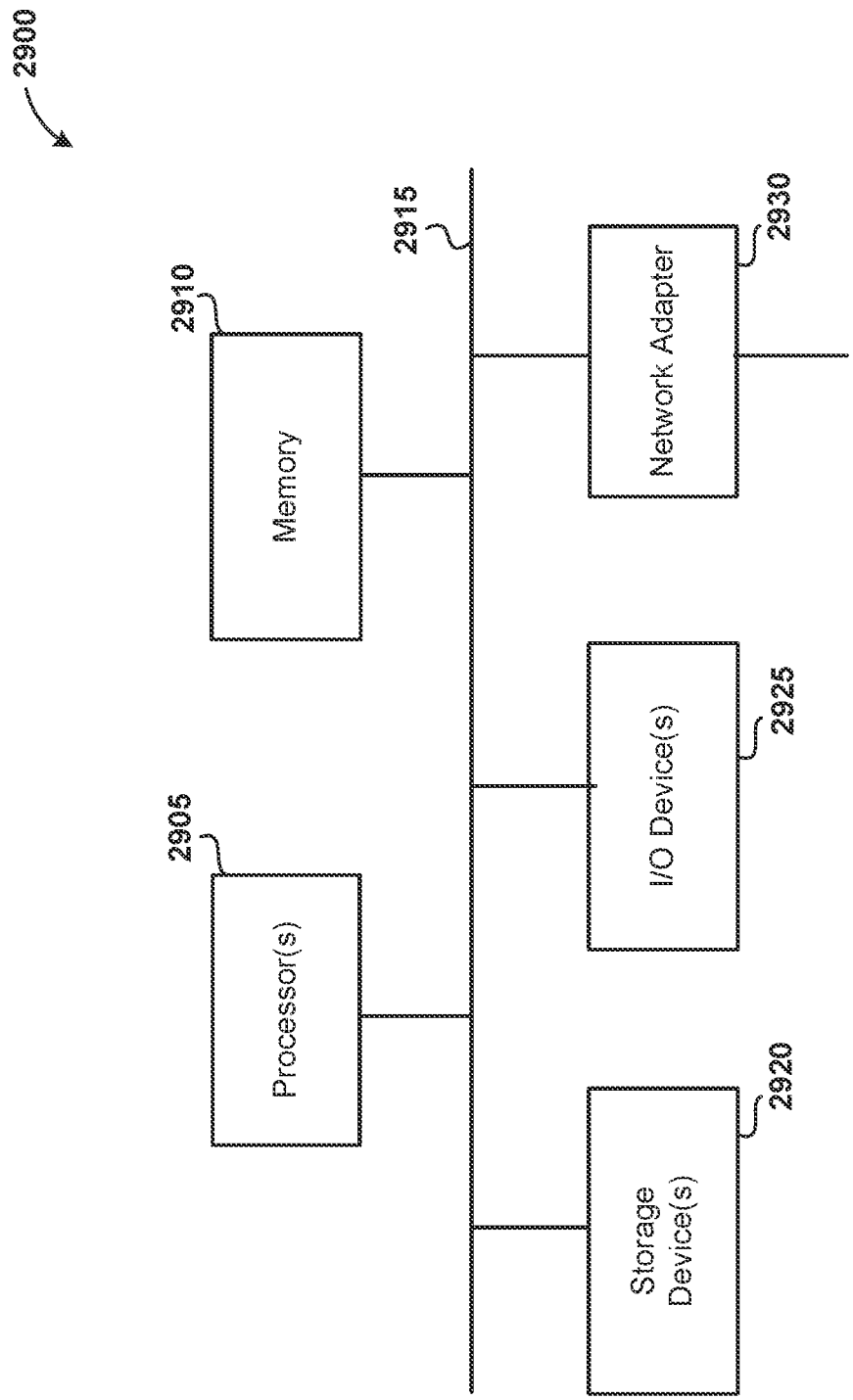
FIG. 29 is a block diagram of a computer system as may be used to implement features of some of the embodiments.

FIG. 29 is a block diagram of a computer system as may be used to implement features of some of the embodiments. The computing system 2900 may include one or more central processing units ("processors") 2905, memory 2910, input/output devices 2925 (e.g., keyboard and/or pointing devices and/or touchscreen devices, display devices, etc.), storage devices 2920 (e.g., disk drives), and network adapters 2930 (e.g., network interfaces) that are connected to an interconnect 2915. The interconnect 2915 is illustrated as an abstraction that represents any one or more separate physical buses, point to point connections, or both connected by appropriate bridges, adapters, or controllers. The interconnect 2915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 2910 and storage devices 2920 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 2910 can be implemented as software and/or firmware to program the processor(s) 2905 to carry out actions described above. In some embodiments, such software or firmware may be initially provided to the processing system 2900 by downloading it from a remote system through the computing system 2900 (e.g., via network adapter 2930).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

18. Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A head mounted display system, comprising:
   a display;
   at least one camera;
   an accelerometer;
   a gyroscope;
   at least one memory;
   machine-readable instructions; and
   at least one processor circuit to be programmed by the machine-readable instructions to:
      detect a first position and a first head direction of a user based on sensor data generated by at least one of the accelerometer, the at least one camera, or the gyroscope at a first point in time;
      determine a latency associated with a time to cause an image to be presented on the display;
      determine a predicted position and a predicted head direction of the user at a second point in time based on the latency, the second point in time after the first point in time;

impose a constraint on a first portion of the image to be presented on the display, the constraint to cause the first portion of the image to be outside a field of view and a second portion of the image to be within the field of view;

render, prior to the second point in time, the second portion of the image for presentation on the display based on the predicted position and the predicted head direction of the user; and cause the display to present the rendered image.

2. The head mounted display system as defined in claim 1, wherein one or more of the at least one processor circuit is to detect the first position and the first head direction based on inertial measurement unit (IMU) data.

3. The head mounted display system as defined in claim 2, wherein one or more of the at least one processor circuit is to retrieve the IMU data at a rate faster than a camera capture rate corresponding to the image.

4. The head mounted display system as defined in claim 1, wherein one or more of the at least one processor circuit is to apply at least one of positional or rotational velocity data to determine the predicted position at the second point in time.

5. The head mounted display system as defined in claim 4, wherein one or more of the at least one processor circuit is to apply a Kalman filter to determine the predicted position.

6. The head mounted display system as defined in claim 1, wherein the constraint is a boarder constraint.

7. The head mounted display system as defined in claim 1, wherein one or more of the at least one processor circuit is to cause a subset of the first portion of the image to be within the field of view after the second point in time.

8. The head mounted display system as defined in claim 7, wherein one or more of the at least one processor circuit is to reduce user nausea by rendering the first portion of the image within the field of view prior to completing processing of a second image corresponding to a second position and a second head direction of the user at the second point in time.

9. A computer readable storage device or storage disk comprising machine-readable instructions that cause at least one processor circuit to at least:

detect a first position and a first head direction of a user based on sensor data generated by at least one of an accelerometer, at least one camera, or a gyroscope at a first point in time;

determine a latency associated with a time to cause an image to be presented on a display;

determine a predicted position and a predicted head direction of the user at a second point in time based on the latency, the second point in time after the first point in time;

impose a constraint on a first portion of the image, the constraint to cause the first portion of the image to be blocked from a field of view and a second portion of the image to be visible within the field of view;

render, prior to the second point in time, the second portion of the image for presentation on the display based on the predicted position and the predicted head direction of the user; and cause the display to present the rendered image.

10. The storage device or storage disk as defined in claim 9, wherein the machine-readable instructions cause one or more of the at least one processor circuit to detect the first position and the first head direction based on inertial measurement unit (IMU) data.

11. The storage device or storage disk as defined in claim 10, wherein the machine-readable instructions cause one or more of the at least one processor circuit to retrieve the IMU data at a rate faster than a camera capture rate corresponding to the image.

12. The storage device or storage disk as defined in claim 9, wherein the machine-readable instructions cause one or more of the at least one processor circuit to apply at least one of positional or rotational velocity data to determine the predicted position at the second point in time.

13. The storage device or storage disk as defined in claim 12, wherein the machine-readable instructions cause one or more of the at least one processor circuit to apply a Kalman filter to determine the predicted position.

14. The storage device or storage disk as defined in claim 9, wherein the machine-readable instructions cause one or more of the at least one processor circuit to impose the constraint as a border constraint on the first portion of the image for presentation on the display.

15. The storage device or storage disk as defined in claim 9, wherein the machine-readable instructions cause one or more of the at least one processor circuit to cause a subset of the first portion of the image to be within the field of view after the second point in time.

16. The storage device or storage disk as defined in claim 15, wherein the machine-readable instructions cause one or more of the at least one processor circuit to reduce user nausea by rendering the first portion of the image within the field of view prior to completing processing of a second image corresponding to a second position and a second head direction of the user at the second point in time.

17. A computer implemented method, comprising:

detecting, by at least one processor circuit programmed by at least one instruction, a first position and a first head direction of a user based on sensor data generated by at least one of an accelerometer, at least one camera, or a gyroscope at a first point in time;

determining, by one or more of the at least one processor circuit, a latency associated with a time to cause an image to be presented on the display;

determining, by one or more of the at least one processor circuit, a predicted position and a predicted head direction of the user at a second point in time based on the latency, the second point in time after the first point in time;

imposing, by one or more of the at least one processor circuit, a constraint on a first portion of the image, the constraint to cause the first portion of the image to be occluded from a field of view and a second portion of the image to be visible within the field of view;

rendering, by one or more of the at least one processor circuit, prior to the second point in time, the second portion of the image for presentation on the display based on the predicted position and the predicted head direction of the user; and causing, by one or more of the at least one processor circuit, the display to present the rendered image.

18. The method as defined in claim 17, further including detecting the first position and the first head direction based on inertial measurement unit (IMU) data.

19. The method as defined in claim 18, further including retrieving the IMU data at a rate faster than a camera capture rate corresponding to the image.

20. The method as defined in claim 17, further including applying at least one of positional or rotational velocity data to determine the predicted position at the second point in time.

21. The method as defined in claim 20, further including applying a Kalman filter to determine the predicted position.

22. The method as defined in claim 17, further including imposing the constraint as a border constraint on the first portion of the image.

23. The method as defined in claim 17, further including causing a subset of the first portion of the image to be within the field of view after the second point in time.

24. The method as defined in claim 23, further including avoiding user nausea by rendering the first portion of the image within the field of view prior to completing processing of a second image corresponding to a second position and a second head direction of the user at the second point in time.

25. A head mounted display system, comprising:
a display;
at least one camera;
an accelerometer;
a gyroscope;
at least one memory;
machine-readable instructions; and
at least one processor circuit to be programmed by the machine-readable instructions to:
  detect a first position and a first head direction of a user based on sensor data generated by at least one of the accelerometer, the at least one camera, or the gyroscope at a first point in time;
  determine a latency associated with a time to cause an image to be presented on the display;
  determine a predicted position and a predicted head direction of the user at a second point in time based on the latency, the second point in time after the first point in time;
  impose a constraint on a first portion of the image, the constraint to cause the first portion of the image to be blocked from a field of view and a second portion of the image to be visible in the field of view;
  render, prior to the second point in time and based on a hole in the image, a mesh, and fill in the hole based on previously acquired depth data from the at least one camera, the previously acquired depth data obtained prior to the first point in time; and
  cause the display to present the rendered image.

* * * * *